US010614518B1

(12) United States Patent
Guduru et al.

(10) Patent No.: US 10,614,518 B1
(45) Date of Patent: Apr. 7, 2020

(54) TECHNIQUES FOR AUDIT MANAGEMENT

(71) Applicant: Capital One Services, LLC, McLean, VA (US)

(72) Inventors: Gowtham Guduru, Mckinney, TX (US); Sohan Ganapathy, Frisco, TX (US); Kartheek Yelamarthi, Plano, TX (US); Rahul Raj, Irving, TX (US); Robert Hays, II, Flower Mound, TX (US); Brent Brantley, Prosper, TX (US); Padmanabhan Balasubramanian, Allen, TX (US); Fnu Manjushri Srikanta Swamy, Dallas, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/189,626

(22) Filed: Nov. 13, 2018

(51) Int. Cl.
*G06Q 40/02* (2012.01)
*G06F 21/30* (2013.01)
*G06F 5/06* (2006.01)
*G06Q 10/10* (2012.01)

(52) U.S. Cl.
CPC ............ *G06Q 40/025* (2013.01); *G06F 5/06* (2013.01); *G06F 21/30* (2013.01); *G06Q 10/10* (2013.01)

(58) Field of Classification Search
None
See application file for complete search history.

(56) References Cited

U.S. PATENT DOCUMENTS

| | | | | |
|---|---|---|---|---|
| 7,110,957 B2 * | 9/2006 | Barnard | ................ | G06Q 10/06 705/7.15 |
| 2002/0072975 A1 * | 6/2002 | Steele | .................... | G06Q 20/10 705/14.1 |
| 2004/0193482 A1 * | 9/2004 | Hoffman | ................ | G06Q 10/06 705/14.69 |
| 2004/0215555 A1 * | 10/2004 | Kemper | ............ | G06Q 30/0283 705/38 |
| 2009/0254511 A1 * | 10/2009 | Yeap | ................... | G06F 21/6245 |
| 2010/0250497 A1 * | 9/2010 | Redlich | ................... | F41H 13/00 707/661 |
| 2012/0331118 A1 * | 12/2012 | Stein | .................... | G06Q 10/067 709/223 |
| 2013/0311196 A1 * | 11/2013 | Fay | .................... | G06Q 10/0635 705/2 |
| 2014/0258243 A1 * | 9/2014 | Bell | ...................... | H04L 67/306 707/690 |
| 2018/0276270 A1 * | 9/2018 | Bisbee | ............... | G06F 21/6218 |

\* cited by examiner

*Primary Examiner* — Fateh M Obaid

(57) ABSTRACT

Various embodiments are generally directed to techniques for audit management, such as for automating and/or streamlining one or more audit processes or procedures, for instance. Some embodiments are particularly directed to generating optimized audit queues and facilitating efficient performance of the audit queues to provide improved audit platforms. For instance, in one or more embodiments, an audit platform may prioritize documents in a batch with identified authentication requirements and/or identified authentication requirements completed by specific associate entities to create an effective worklist, or audit queue, that covers predefined audit targets for the documents and/or associate entities. In various embodiments, the audit platform may present documents in the worklist and/or associated authentication requirements along with one or more tasks or baselines for completion and/or verification via one or more user interfaces.

20 Claims, 19 Drawing Sheets

100A

100B

100C

200

300A

300B

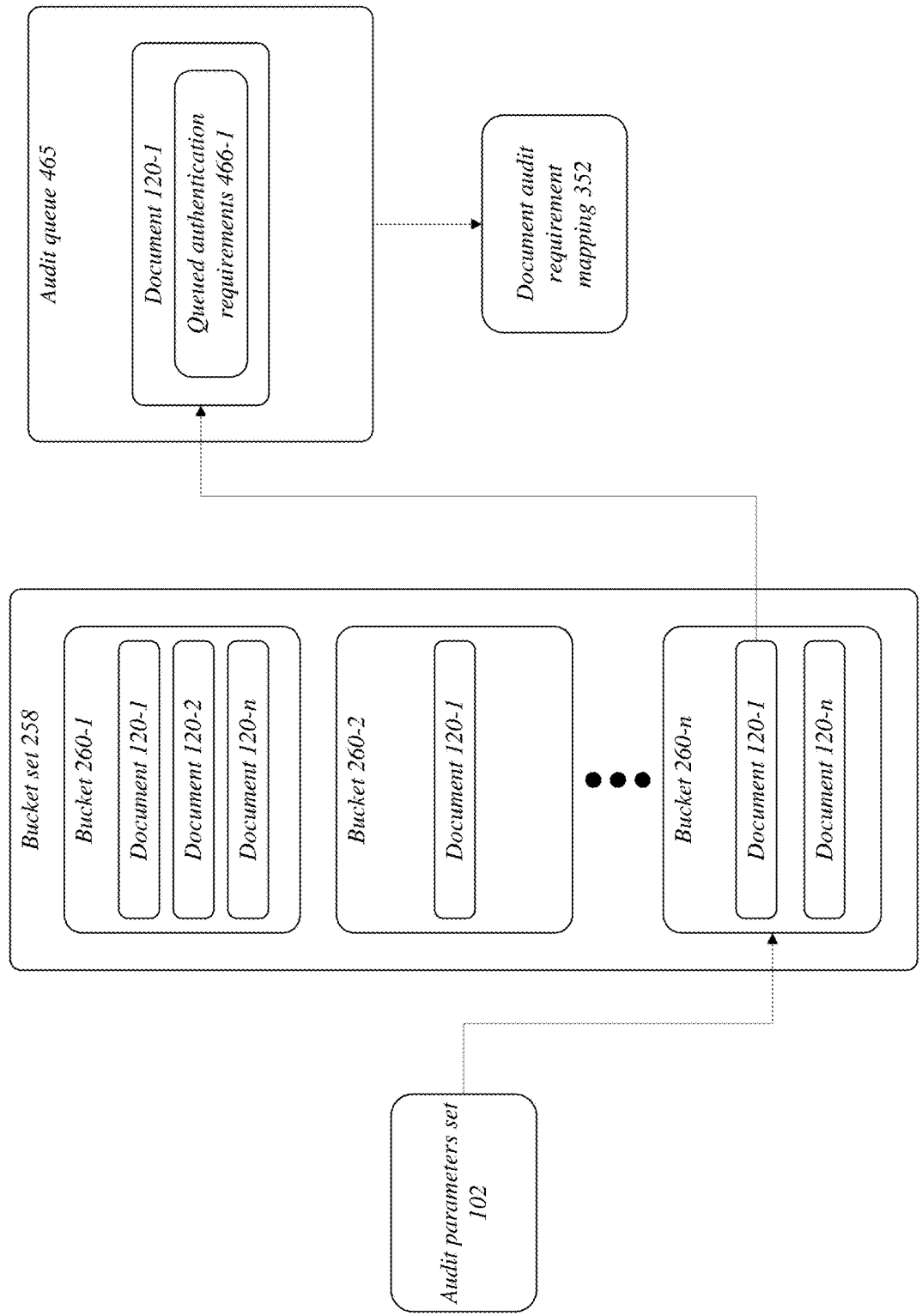

600A

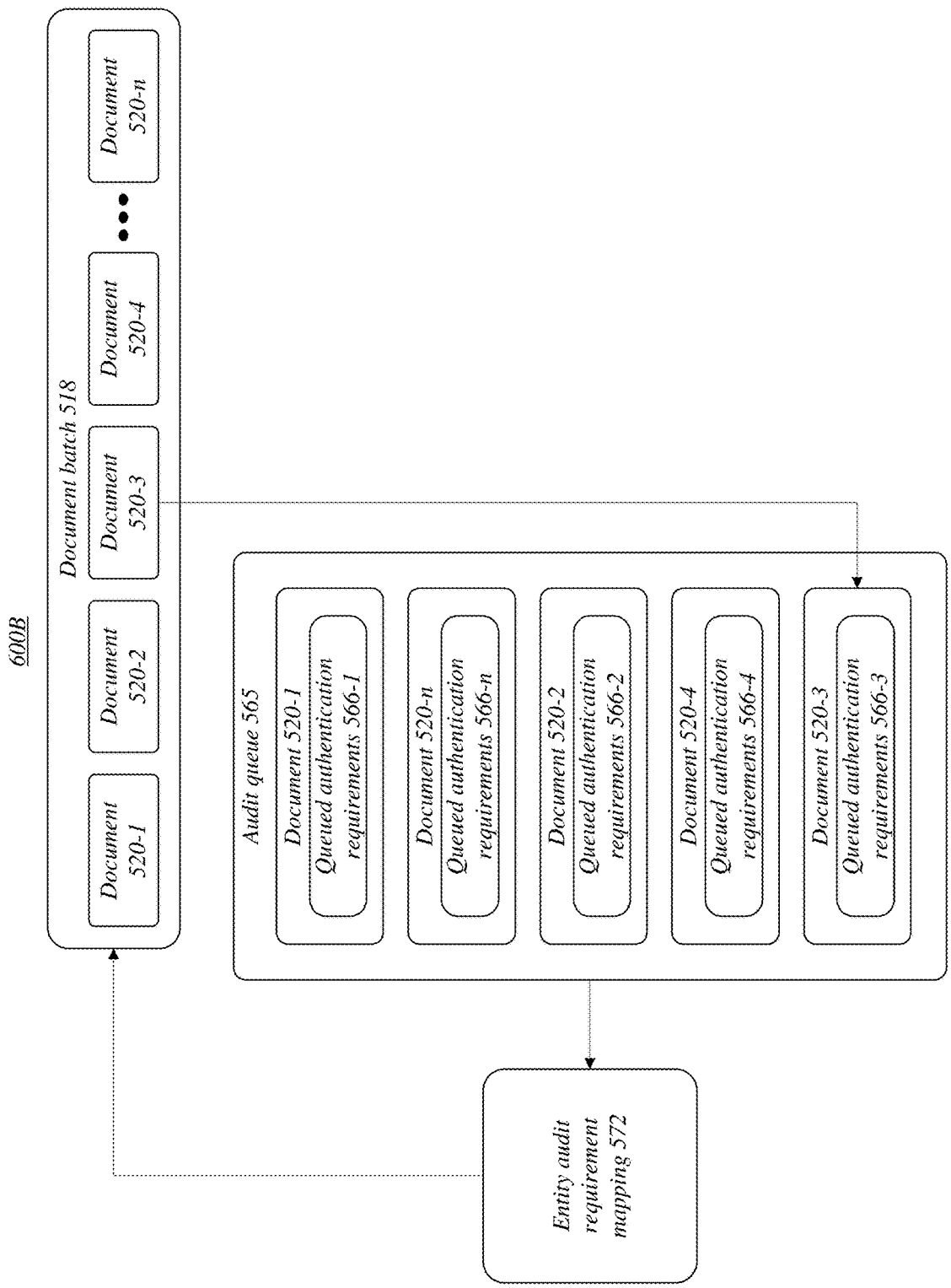

700A

700B

User interface 780B

*700C*

User interface
780C

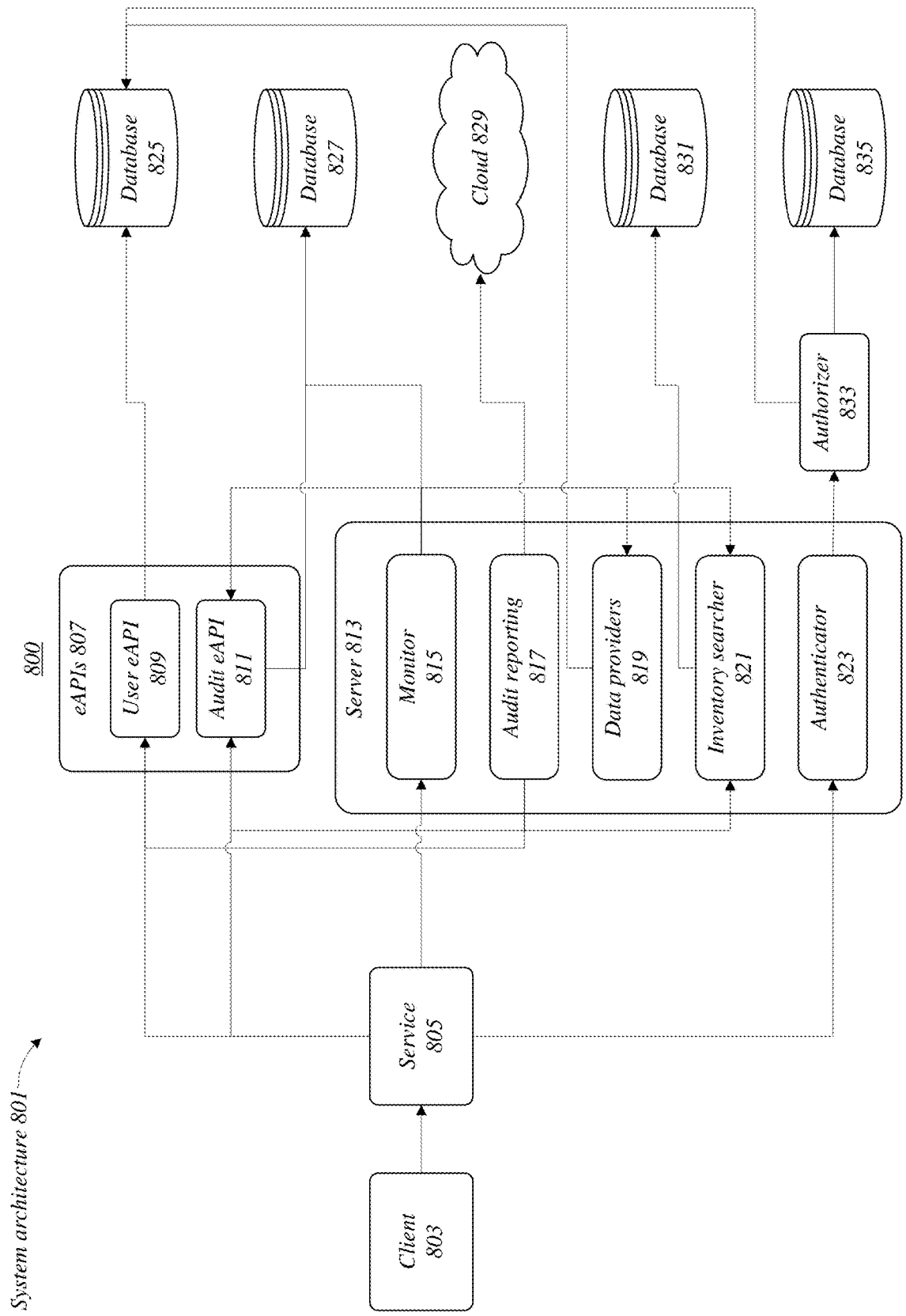

TECHNIQUES FOR AUDIT MANAGEMENT

BACKGROUND

An audit may refer to the practice of independently reviewing subject matter to determine whether the subject matter provides a true and fair representation of the subject matter. For instance, audits may be performed to ascertain the validity and/or reliability of information, as well as an assessment of the internal control of a system. Audits may come in a variety of forms and focus on numerous types of subject matter, such as financial audits, performance audits, quality audits, regulatory audits, operations audits, energy audits, forensic audits, information technology audits, and more. Typically, audits are used to provide third party assurance to various stakeholders that the subject matter is free from material misstatement. Stakeholders may utilize an audit to evaluate one or more of risk management, control, and governance over the audited subject matter.

BRIEF DESCRIPTION OF THE DRAWINGS

FIG. 4A, FIG. 4B, and FIG. 4C illustrate exemplary aspects of generating an audit queue and updating a document audit requirement mapping according to one or more embodiments described herein.

FIG. 6A and FIG. 6B illustrate exemplary aspects of generating an audit queue in conjunction with an entity audit requirement mapping according to one or more embodiments described herein.

FIG. 8 illustrates exemplary aspects of a system architecture according to one or more embodiments described herein.

DETAILED DESCRIPTION

Figure 1A:
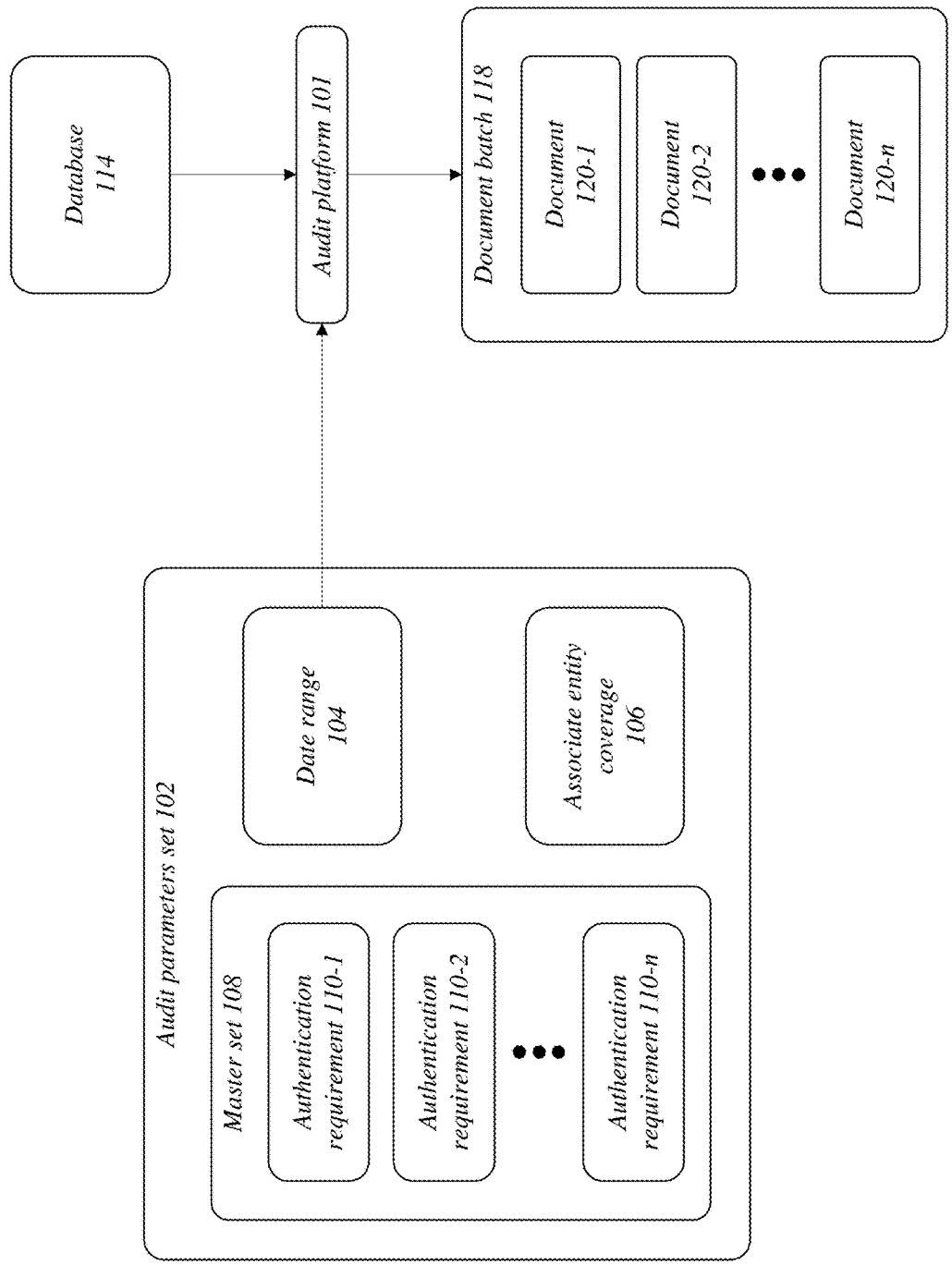
FIG. 1A illustrates exemplary aspects of identifying a document batch according to one or more embodiments described herein.

Various embodiments are generally directed to techniques for audit management, such as for automating and/or streamlining one or more audit processes or procedures, for instance. Some embodiments are particularly directed to generating optimized audit queues and facilitating efficient performance of the audit queues to provide improved audit platforms. For instance, in one or more embodiments, an audit platform may prioritize documents in a batch with identified authentication requirements and/or identified authentication requirements completed by specific associate entities to create an effective worklist, or audit queue, that covers predefined audit targets for the documents and/or associate entities. In various embodiments, the audit platform may present documents in the worklist and/or associated authentication requirements along with one or more tasks or baselines for completion and/or verification via one or more user interfaces. In various such embodiments, the one or more user interfaces may facilitate completion of the worklist, such as via one or more auditors interacting with the user interface. These and other embodiments are described and claimed.

Some challenges facing auditing systems include the inability to identify and provide documents for audit in an efficient and optimized manner. These challenges may result from audit platforms utilizing a plurality of subsystems that need manually intensive and error prone operations to interact and produce an audit queue. For instance, auditing system may require a quality assurance manager to manually import loan applications funded on a previous day into a spreadsheet to create an audit queue. Adding further complexity, audit platforms may be incapable of optimizing audit queues to achieve desired audit coverages without unnecessary redundancy and considerable time investments. For example, a quality assurance manager may have to manually remove and/or move the applications up and down in a spreadsheet in an attempt to optimize the audit queue. In such examples, the limited working memory of the quality assurance manager may prevent adequate consideration of all factors necessary to generate a fully optimized audit queue. Sometimes, quality assurance managers may introduce biases into auditing processes. These and other factors may result in audit platforms with limited scalability, deficient performance, poor adaptability, and insufficient ability to provide optimal and efficient audit services. Such limitations can drastically reduce the capabilities, usability, and applicability of the audit platform, contributing to inefficient systems with limited capabilities.

Various embodiments described herein include an audit platform that is able to automate audit processes in a scalable, adaptable, intuitive, and optimized manner. In many embodiments, the audit platform may be able to retrieve a batch of documents, such as loan applications, and automatically generate an audit queue that meets specified audit coverage requirements. In many such embodiments, the audit platform may require little or no input to generate the audit queue, such as just a date or date range for which to obtain the documents. In one or more embodiments, the audit queue may include a prioritized list of tasks to insure appropriate audit coverage for authentication requirements, such as funding requirements, and/or for associate entities, such as the funders who have completed the funding requirements. In many embodiments, little to no manual intervention may be required to create the audit queue or worklist. For example, inputting a date or date range may result in an audit queue being generated. In various embodiments, the audit platform may utilize randomization, such as reduce or eliminate biasing audit processes.

Further, the audit platform may automatically compensate for coverage shortfalls for a given date range or audit queue by compensating in the next date range or audit queue. In some embodiments, the audit platform may eliminate bias from audit queues. In many embodiments, the audit platform may improve audit coverage accuracy while reducing duplicative or superfluous work. In various embodiments, the audit platform may facilitate completion of the audit queue. For instance, the audit platform may present tasks and gather/make resources available to facilitate completion of the tasks, such as via an intuitive user interface. In these and other ways the audit platform may enable quick and effective generation and/or completion of audit queues to enable desired audit coverage in an accurate, efficient, dynamic, and scalable manner, resulting in several technical effects and advantages including increased capabilities and improved adaptability.

In one embodiment, for example, an apparatus may include a processor and a memory comprising instructions that when executed by the processor cause the processor to perform one or more of the following. In some embodiments, the processor may be caused to identify a set of identify a set of audit parameters comprising a master set of authentication requirements and a date range. In some such embodiments, each authentication requirement in the master set of authentication requirements may be associated with a priority, an audit percentage, one or more audit rules, and one or more baselines. In many embodiments, the processor may be caused to determine a document batch to analyze based on the date range. In many such embodiments, each document in the document batch may include one or more requisite authentication requirements and each of the one or more requisite authentication requirements may correspond to an associate entity; further, each of the one or more requisite authentication requirements may correspond to one of the authentication requirements from the master set of authentication requirements.

In various embodiments, the processor may be caused to calculate one or more document audit requirements for each authentication requirement in the master set based on the document batch and the set of audit parameters. In one or more embodiments, the processor may be caused to generate a document audit requirement mapping for the document batch based on the one or more document audit requirements for each authentication requirement in the master set. In some embodiments, the processor may be caused to create a set of buckets comprising a bucket for each authentication requirement in the master set of authentication requirements. In one or more embodiments, the processor may be caused to sort the document batch by authentication requirements with the set of buckets. In one or more such embodiments, a document with multiple requisite authentication requirements may be sorted into a corresponding multiple of buckets.

In many embodiments, the processor may be caused to select a first bucket from the set of buckets based on the set of audit parameters. In some embodiments, the processor may be caused to identify a first document in the first bucket. In some such embodiments, the first document may comprise the document with a largest number of authentication requirements in the first bucket. In various embodiments, the processor may be caused to add the first document to an audit queue in a first in, first out (FIFO) manner. In one or more embodiments, the processor may be caused to update the document audit requirement mapping based on the authentication requirements associated with the first document and addition of the first document to the audit queue. In some embodiments, the processor may be caused to determine a first document audit requirement associated with the first bucket is unsatisfied based on the document audit requirement mapping.

In several embodiments, the processor may be caused to identify a second document in the first bucket. In several such embodiments, the second document may comprise the document with a second largest number of authentication requirements in the first bucket. In one or more embodiments, the processor may be caused to add the second document to the audit queue in the FIFO manner. In many embodiments, the processor may be caused to update the document audit requirement mapping based on the authentication requirements associated with the second document and addition of the second document to the audit queue. In various embodiments, the processor may be caused to determine the first document audit requirement associated with the first bucket is satisfied. In some embodiments, one or more of the operations performed by the processor may enable the processor to provide novel and advantageous functionality that results in a more efficient and effective audit platform.

Various embodiments described herein may include an apparatus, comprising: a processor; and a memory comprising instructions that when executed by the processor may cause the processor to perform operations comprising one or more of: identify a set of audit parameters comprising a master set of authentication requirements and a date range, wherein each authentication requirement in the master set of authentication requirements is associated with a priority, an audit percentage, one or more audit rules, and one or more baselines; determine a document batch to analyze based on the date range, wherein each document in the document batch includes one or more requisite authentication requirements and each of the one or more requisite authentication requirements corresponds to an associate entity, and wherein each of the one or more requisite authentication requirements corresponds to one of the authentication requirements from the master set of authentication requirements; calculate one or more document audit requirements for each authentication requirement in the master set based on the document batch and the set of audit parameters; generate a document audit requirement mapping for the document batch based on the one or more document audit requirements for each authentication requirement in the master set; create a set of buckets comprising a bucket for each authentication requirement in the master set of authentication requirements; sort the document batch by authentication requirements with the set of buckets, wherein a document with multiple requisite authentication requirements is sorted into a corresponding multiple of buckets; select a first bucket from the set of buckets based on the set of audit parameters; identify a first document in the first bucket, wherein the first document comprises the document with a largest number of authentication requirements in the first bucket; add the first document to an audit queue in a first in, first out (FIFO) manner; update the document audit requirement mapping based on the authentication requirements associated with the first document and addition of the first document to the audit queue; determine a first document audit requirement associated with the first bucket is unsatisfied based on the document audit requirement mapping; identify a second document in the first bucket, wherein the second document comprises the document with a second largest number of authentication requirements in the first bucket; add the second document to the audit queue in the FIFO manner; update the document audit requirement mapping based on the authentication requirements associated with the second document and addition of the second document to the audit queue; and determine the first document audit requirement associated with the first bucket is satisfied.

In some embodiments, the processor of the apparatus may be caused to perform operations comprising one or more of: select a second bucket from the set of buckets based on the set of audit parameters; identify a third document in the second bucket, wherein the third document comprises the document with a largest number of authentication requirements in the second bucket that is not already in the audit queue; add the third document to the audit queue in the FIFO manner; update the document audit requirement mapping based on the authentication requirements associated with the third document and addition of the third document to the audit queue; and determine a second document audit requirement associated with the second bucket is satisfied based on the document audit requirement mapping.

In various embodiments, the audit queue may comprise an ordered list of one or more documents in the document batch to audit to satisfy the one or more document audit requirements for each authentication requirement in the master set.

In many embodiments, the processor of the apparatus may be caused to perform operations comprising one or more of: calculate one or more entity audit requirements for each associate entity corresponding to one or more documents in the document batch based on the document batch and the set of audit parameters; determine a first entity audit requirement unsatisfied by the audit queue, the first entity audit requirement corresponding to a first associate entity; add a first document corresponding to the first entity audit requirement and the first associate entity to the audit queue from the document batch based on the first entity audit requirement being unsatisfied; determine the first entity audit requirement remains unsatisfied after adding the first document to the audit queue; add a second document corresponding to the first entity audit requirement and the first associate entity to the audit queue from the document batch based on the first entity audit requirement being unsatisfied after adding the first document to the audit queue; and determine the first entity audit requirement is satisfied after adding the second document to the audit queue.

In one or more embodiments, selection of the first bucket from the set of buckets may be based on the document batch and the priorities in the set of audit parameters. In some embodiments, calculation of the one or more document audit requirements for each authentication requirement in the master set may be based on the document batch, the one or more audit percentages in the set of audit parameters, and the one or more audit rules in the set of audit parameters. In several embodiments, each document in the document batch may comprise a loan application and the master set of authentication requirements may include one or more of proof of income, proof of residence, gap insurance, service contract, and social security number.

Some embodiments described herein may include a computer-implemented method, comprising one or more of: identifying a set of audit parameters comprising a master set of authentication requirements and a date range, wherein each authentication requirement in the master set of authentication requirements includes a priority, an audit percentage, one or more audit rules, and one or more baselines; determining a document batch to analyze based on the date range, wherein each document in the document batch includes one or more requisite authentication requirements and each of the one or more requisite authentication requirements corresponds to an associate entity, and wherein each of the one or more requisite authentication requirements corresponds to one of the authentication requirements from the master set of authentication requirements; calculating one or more document audit requirements for each authentication requirement in the master set based on the document batch and the set of audit parameters; generating an audit queue, the audit queue comprising an ordered list of one or more documents in the document batch to audit to satisfy the one or more document audit requirements for each authentication requirement in the master set; calculating one or more entity audit requirements for each associate entity corresponding to one or more documents in the document batch based on the document batch and the set of audit parameters; determining a first entity audit requirement unsatisfied by the audit queue, the first entity audit requirement corresponding to a first associate entity; adding a first document corresponding to the first entity audit requirement and the first associate entity to the audit queue from the document batch based on the first entity audit requirement being unsatisfied; determining the first entity audit requirement remains unsatisfied after adding the first document to the audit queue; adding a second document corresponding to the first entity audit requirement and the first associate entity to the audit queue from the document batch based on the first entity audit requirement being unsatisfied after adding the first document to the audit queue; and determining the first entity audit requirement is satisfied after adding the second document to the audit queue.

In various embodiments the first entity audit requirement may include an audited baseline threshold for the first associate entity. In one or more embodiments, the computer-implemented method may include determining the first entity audit requirement unsatisfied by the audit queue based on a number of audited baselines associated with the first associate entity failing to meet the audited baseline threshold for the first entity associate. In some embodiments, calculation of the one or more entity audit requirements for each associate entity may be based on the document batch, the audit percentages in the set of audit parameters, the one or more audit rules in the set of audit parameters, and the one or more baselines in the set of audit parameters.

In many embodiments calculation of the one or more document audit requirements for each authentication requirement in the master set may be based on the document batch, the one or more audit percentages in the set of audit parameters, and the one or more audit rules in the set of audit parameters. In some embodiments, each document in the document batch may comprise a loan application and each document in the document batch may be included in the audit queue one or fewer times.

In some embodiments, the computer-implemented method may include one or more of creating a set of buckets comprising a bucket for each authentication requirement in the master set of authentication requirements; sorting the document batch by authentication requirements with the set of buckets, wherein a document with multiple requisite authentication requirements is sorted into a corresponding multiple of buckets; selecting a first bucket from the set of buckets based on the set of audit parameters; identifying a first document in the first bucket, wherein the first document comprises the document in the first bucket with a largest number of authentication requirements; and adding the first document to an audit queue in a first in, first out (FIFO) manner.

Several embodiments described herein may include at least one non-transitory computer-readable medium comprising a set of instructions that, in response to being executed by a processor circuit, cause the processor circuit to perform operations comprising one or more of: determine one or more document audit requirements for each authentication requirement in a master set based on a document batch and a set of audit parameters; calculate one or more entity audit requirements for each associate entity corresponding to one or more documents in the document batch based on the document batch and the set of audit parameters; generate an audit queue based on the one or more document audit requirements and the one or more entity audit requirements, the audit queue comprising an ordered list of one or more documents in the document batch to audit to satisfy the one or more document audit requirements for each authentication requirement in the master set and the one or more entity audit requirements; identify a first document corresponding to a first associate entity in the audit queue to audit based on the ordered list; present a first set of baselines associated with the first document to complete via a user interface, wherein the first set of baselines is completed to audit the first document; determine the audit of the first document is complete based on input received via the user interface to complete each baseline in the first set of baselines; identify a second document corresponding to a second associated entity in the audit queue to audit based on the ordered list after audit of the first document is complete; present a second set of baselines associated with the second document to complete via the user interface, wherein the second set of baselines is completed to audit the second document; and determine the audit of the second document is complete based on input received via the user interface to complete each baseline in the second set of baselines.

In various embodiments, the at least one non-transitory computer-readable medium may include instructions that, in response to being executed by the processor circuit, cause the processor circuit to perform operations comprising one or more of determine the first associate entity is in compliance based on the one or more entity audit requirements corresponding to the first associate entity and the input received via the user interface to complete one or more baselines in the first set of baselines. In many embodiments, each document in the document batch may comprise a loan application and each document in the document batch may be included in the audit queue one or fewer times.

In one or more embodiments, the at least one non-transitory computer-readable medium may include instructions that, in response to being executed by the processor circuit, cause the processor circuit to perform operations comprising one or more of determine the first associate entity is out of compliance based on the one or more entity audit requirements corresponding to the first associate entity and the input received via the user interface to complete one or more baselines in the first set of baselines. In some embodiments, the at least one non-transitory computer-readable medium may include instructions that, in response to being executed by the processor circuit, cause the processor circuit to perform operations comprising flag the first associate entity for further auditing when the first associate entity is out of compliance.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatuses may be specially constructed for the required purpose or may include a general-purpose computer. The required structure for a variety of these machines will be apparent from the description given. For instance, in some embodiments, a machine may include a virtual machine implemented on a computing platform.

Reference is now made to the drawings, wherein like reference numerals are used to refer to like elements throughout. In the following description, for purpose of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modification, equivalents, and alternatives within the scope of the claims.

FIG. 1A illustrates exemplary aspects of identifying a document batch 118, such as with an audit platform 101, in environment 100A according to one or more embodiments described herein. The environment 100A may include audit platform 101, audit parameters set 102, database 114, and document batch 118. In one or more embodiments described herein, audit parameters set 102 may be utilized by audit platform 101 in conjunction with database 114 to identify document batch 118 including one or more documents 120-1, 120-2, 120-n. In many embodiments, the document batch 118 may be identified in database 114 based on a date range 104 in the audit parameters set 102. In some embodiments, audit parameters set 102 may include a master set 108 of one or more authentication requirements 110-1, 110-2, 110-n and associate entity coverage 106. In several embodiments described herein, audit parameters set 102 may be utilized by audit platform 101 to generate optimized audit queues and/or facilitate efficient performance of the audit queues. For instance, in one or more embodiments, the audit platform 101 may prioritize documents in document batch 118 based on master set 108 and/or associate entity coverage 106. Embodiments are not limited in this context.

In some embodiments, the audit platform may include internal or attached storage, such as a non-transitory computer-readable medium, or access to external storage, for one or more of the audit parameters set 102, database 118, and document batch 118. For instance, audit parameters set 102 and document batch 118 may be locally stored on audit platform 101 while database 114 is external to audit platform 101. In various such instances, audit platform 101 may access database 114 via wired and/or wireless communication channels.

In several embodiments, audit platform 101 may utilize master set 108 of one or more authentication requirements 110-1, 101-2, 101-*n* along with associated entity coverage 106 to prioritize documents 120 in batch 118 to generate an audit queue and/or facilitate performance of the audit queue. For example, loan (e.g., auto loan) applications may have various authentication requirements (e.g., proof of income, proof of residence, gap insurance requirements, service contract, valid social security number). In various embodiments, tasks or baselines associated with each of the authentication requirements may be performed to audit and/or complete a respective authentication requirement. In many embodiments, the associate entity coverage 106 may enable audit platform 101 to determine whether an associate entity, such as one completing and/or submitting authentication requirements as a car salesman or car dealer, is being appropriately audited. For example, each associate entity listed in associated entity coverage may be audited equally. In some embodiments, coverage for each associated entity may be assigned independently. For instance, different car dealers or car salesmen may have different audit coverages.

Figure 1B:
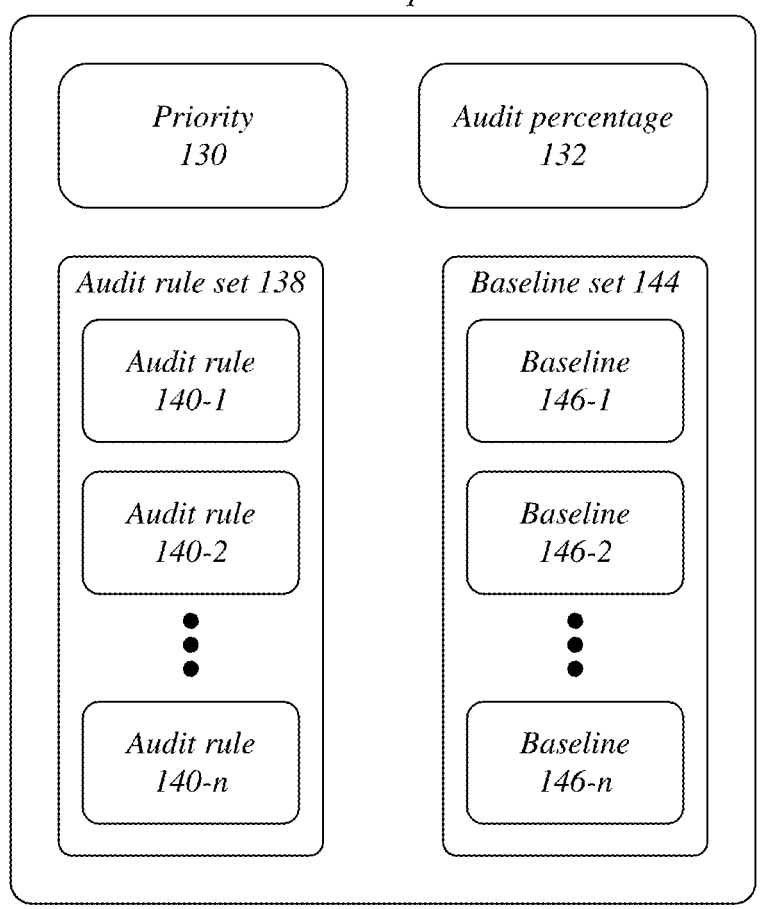
FIG. 1B illustrates exemplary aspects of an authentication requirement according to one or more embodiments described herein.

FIG. 1B illustrates exemplary aspects of an authentication requirement 110 in environment 100B, according to one or more embodiments described herein. Referring to FIG. 1B, each authentication requirement 110 in master set 108 may include, correspond to, or be associated with one or more of a priority 130, an audit percentage 132, an audit rule set 138 of one or more audit rules 140-1, 140-2, 140-*n*, and a baseline set 144 of one or more baselines 146-1, 146-2, 146-*n*. In many embodiments, authentication requirement 110 may be representative each of the one or more authentication requirements 110-1, 110-2, 110-*n* in master set 108. In one or more embodiments described herein, authentication requirement 110 may be used by audit platform 101 to ensure a desired audit coverage for the authentication requirement 110 is achieved. In one or more such embodiments, the desired audit coverage may be achieved with respect to one or more of the quantity, quality, accuracy, and the like. In many embodiments, priority 130, audit percentage 132, and audit rule set 138 may be used by audit platform 101 to optimize an audit queue. In several embodiments, baseline set 144 may include one or more baselines 146 that correspond to tasks or procedures required to complete and/or audit authentication requirement 110. For example, each of the baselines in baseline set 144 may be presented by audit platform 101 for completion or verification to audit the authentication requirement 110. Embodiments are not limited in this context.

In some embodiments, priority 130 may be used indicate or assign priority among different authentication requirements. In several embodiments, audit percentage 132 may be used calculate how many of a respective authentication requirement in a batch should be audited. For example, 40% of instances of authentication requirement 110-1, 50% of instances of authentication requirement 110-2 and 25% of instances of authentication requirement 110-*n* may need to be audited in each document batch 118. In some embodiments, audit rule set 138 may include one or more audit rules 140-1, 140-2, 140-*n* to select and/or prioritize documents in a batch for audit. In some such embodiments, audit rule set 138 may include audit rules 140 to account for audit coverage discrepancies existing from previous audit queues. In various embodiments, audit platform 101 may generate and/or edit audit rules 138.

In many embodiments, baseline set 144 may include one or more baselines 146-1, 146-2, 146-*n*. In many such embodiments, one or more baselines 146 in baseline set 144 may be performed in order to successfully audit an instance of the authentication requirement 110 in one or more documents 120. In some embodiments, associate entity coverage 106 may require a minimum number or percent of baselines be audited for each associated entity in a date range 104.

Figure 1C:
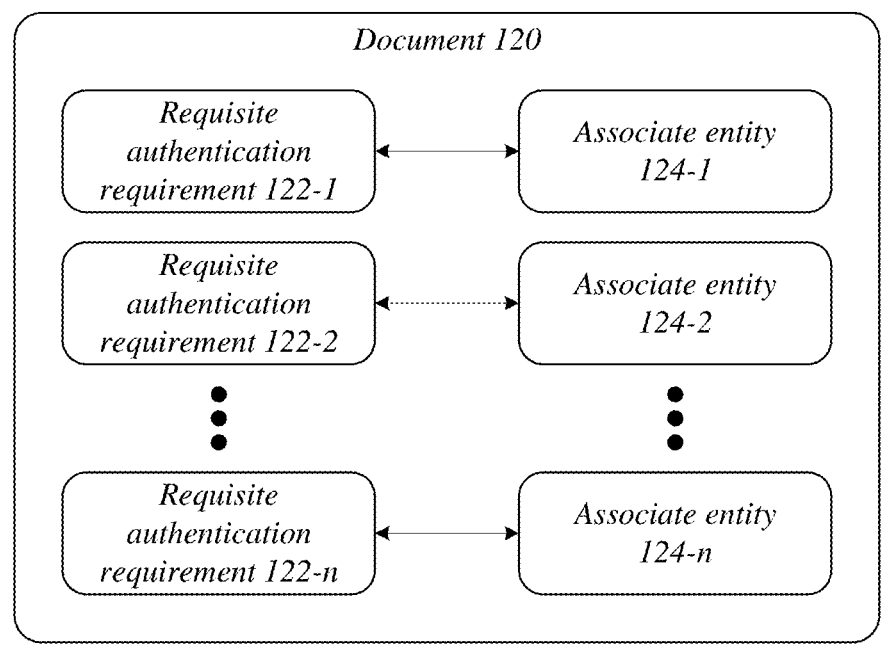
FIG. 1C illustrates exemplary aspects of a document according to one or more embodiments described herein.

FIG. 1C illustrates exemplary aspects of a document 120 in environment 100C, according to one or more embodiments described herein. Referring to FIG. 1C, each document 120 in document batch 118 may include, correspond to, or be associated with one or more requisite authentication requirements 122-1, 122-2, 122-*n* and each requisite authentication requirement 122 may have a corresponding associated entity 124-1, 124-2, 124-*n*, respectively. In many embodiments, document 120 may be representative each of the one or more documents 120-1, 120-2, 120-*n* in document batch 118. In several embodiments, requisite authentication requirements 122 may correspond to at least one of the authentication requirements 110 in master set 108. In one or more embodiments described herein, audit platform 101 may generate an audit queue for document batch 118 by creating an ordered listing of requisite authentication requirements 110 that adheres to audit parameters set 102. In some embodiments, associate entity 124 may identify the party responsible for the completion and/or submission of the corresponding requisite authentication requirement 122. Embodiments are not limited in this context.

Figure 2:
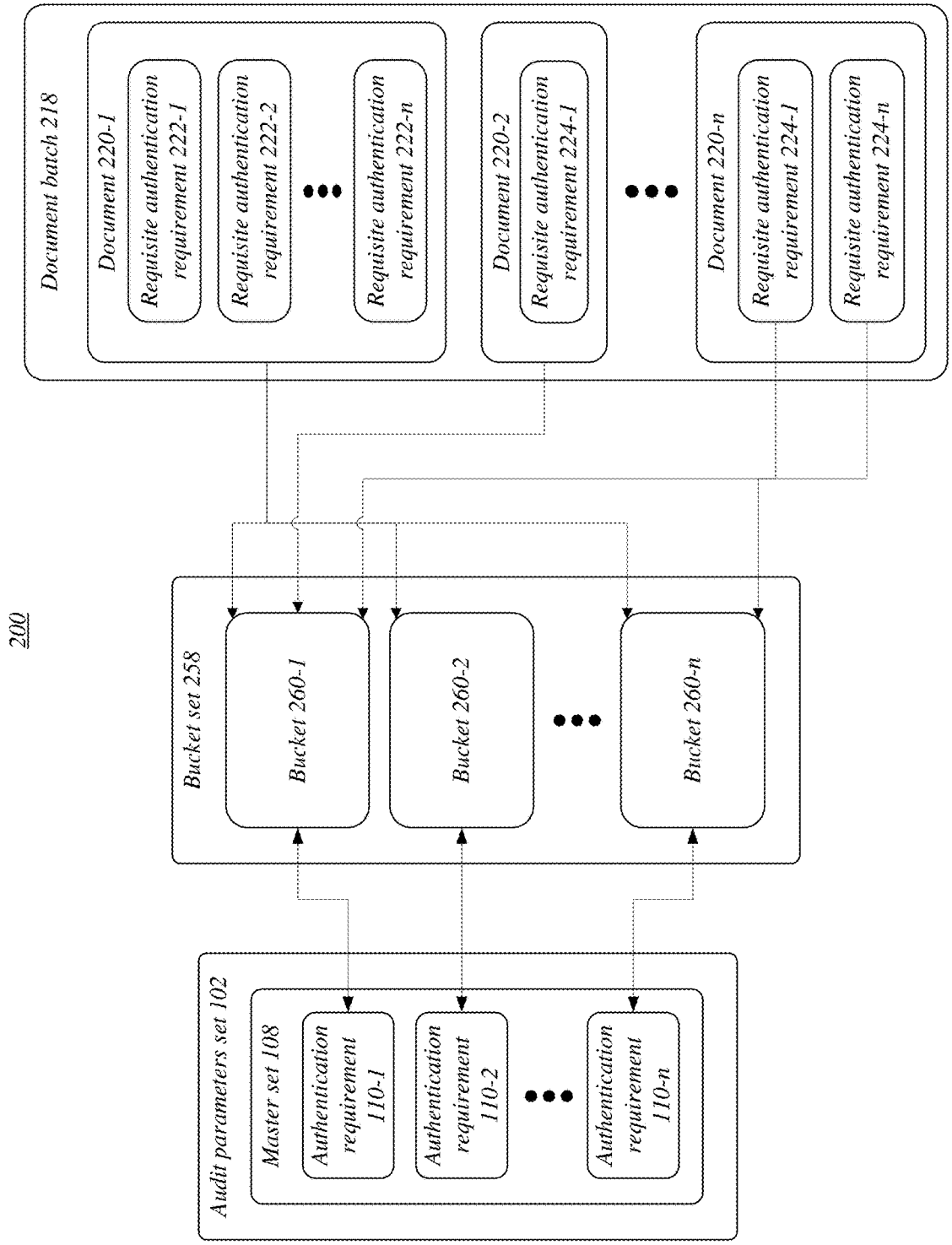
FIG. 2 illustrates exemplary aspects of sorting documents into buckets based on authentication requirements according to one or more embodiments described herein.

FIG. 2 illustrates exemplary aspects of sorting documents into buckets based on authentication requirements, such as with an audit platform 101, in environment 200 according to one or more embodiments described herein. The environment 200 may include audit parameters set 102 with master set 108 of one or more authentication requirements 110-1, 110-2, 110-*n*, bucket set 258 with one or more buckers 260-1, 260-2, 260-*n*, and document batch 218 with one or more documents 220-1, 220-2, 220-*n*. As shown in the illustrated embodiments, document 220-1 may include one or more requisite authentication requirements 222-1, 222-2, and 222-*n*, document 220-*n* may include requisite authentication requirement 224-1, and document 220-*n* may include requisite authentication requirements 224-1, 224-2. In several embodiments described herein, bucket set 258 may be generated, such as by audit platform 101, with a bucket corresponding to each authentication requirement 110. In many embodiments, documents in document batch 218 may be sorted into different buckets according to their respective requisite authentication requirements. In some embodiments, a count of documents that include each authentication may be determined.

In the illustrated embodiment of environment 200, document batch 218 may be sorted into buckets 260-1, 260-2, 260-*n* as follows. Document 220-1, or an indication thereof, would be added to each of buckets 260-1, 260-2, 260-*n*, document 220-2, or an indication thereof, would be added to bucket 260-1, and document 220-*n*, or an indication thereof, would be added to buckets 260-1, 260-*n*. It follows that bucket 260-1 may include documents 220-1, 220-2, 220-*n*, or representations thereof, bucket 260-2 may include document 220-1, or a representation thereof, and bucket 260-*n* may include document 220-1, 220-*n*, or representations thereof. Further, based on bucket set 258 it may be determined that authentication requirement 110-1 is included in or associated with three documents in document batch 218, authentication requirement 110-2 is included in or associated with one document in document batch 218, and authentication requirement 110-*n* is associated with two documents in document batch 218.

In various embodiments, documents may be prioritized with the buckets 260 according to the number of requisite funding requirement included in or associated with the documents. For instance, document 220-1 may appear at the top of each bucket 260 because it has more requisite authentication requirements that the other documents 220-2, 220-*n*. In such instances, documents that appear at the top of a bucket or have the highest priority in the bucket may be added to an audit queue first, as will be described in more detail below, such as with respect to FIGS. 4A-4C.

Figure 3A:
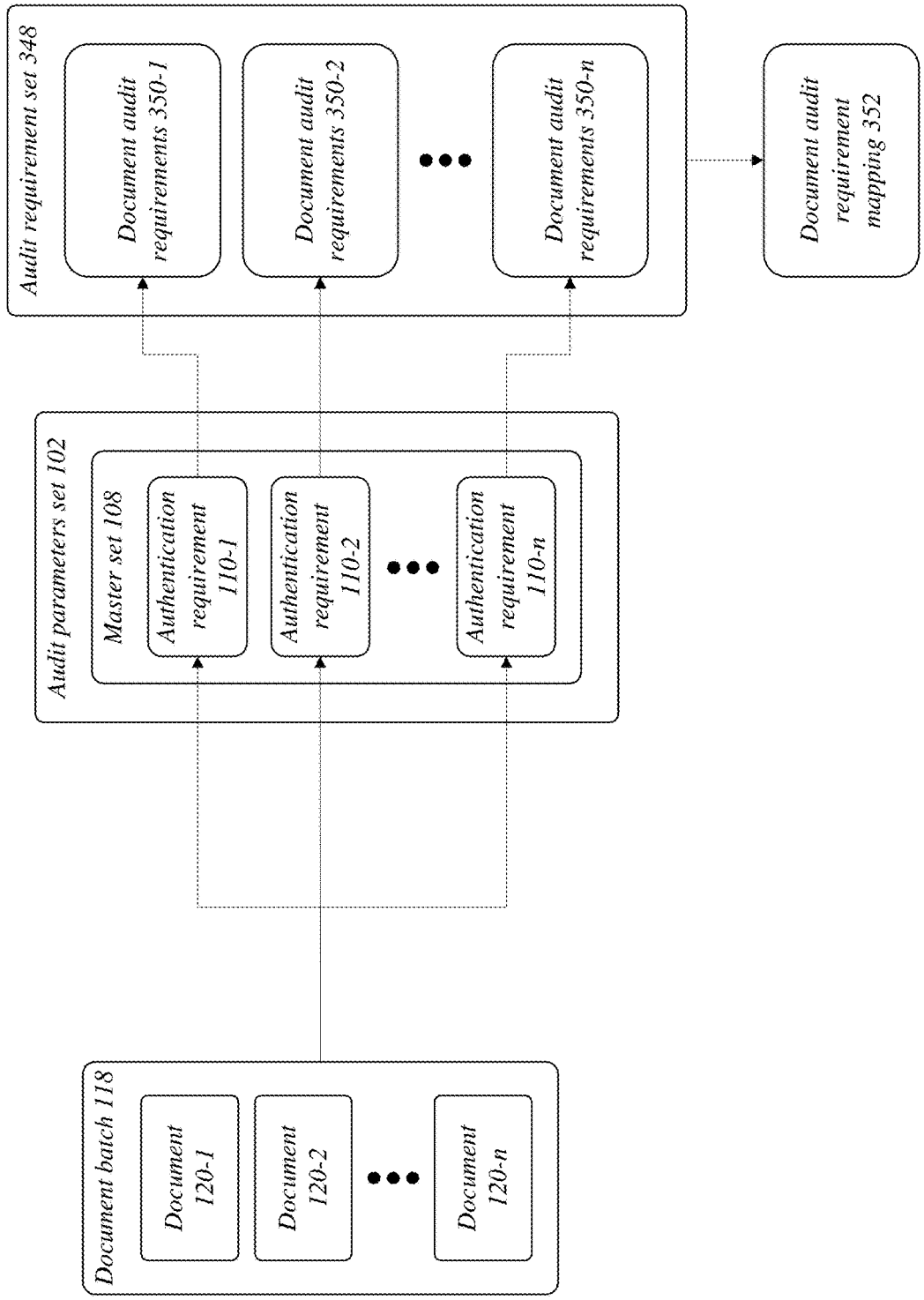
FIG. 3A illustrates exemplary aspects of generating a document audit requirement mapping according to one or more embodiments described herein.

FIG. 3A illustrates exemplary aspects of generating a document audit requirement mapping 352, such as with audit platform 101, in an environment 300A according to one or more embodiments described herein. In one or more embodiments described herein, document batch 118 may be utilized in conjunction with audit parameters set 102 to identify an audit requirement set 348 with one or more document audit requirements 350-1, 350-2, 350-*n* for each of the one or more authentication requirements 110-1, 110-2, 110-*n* in master set 108. In various embodiments, the document audit requirement mapping 352 may be generated based on the audit requirement set 348 to track the status of each of the document audit requirements 350-1, 350-2, 350-*n* during construction of an audit queue. Embodiments are not limited in this context.

Figure 3B:
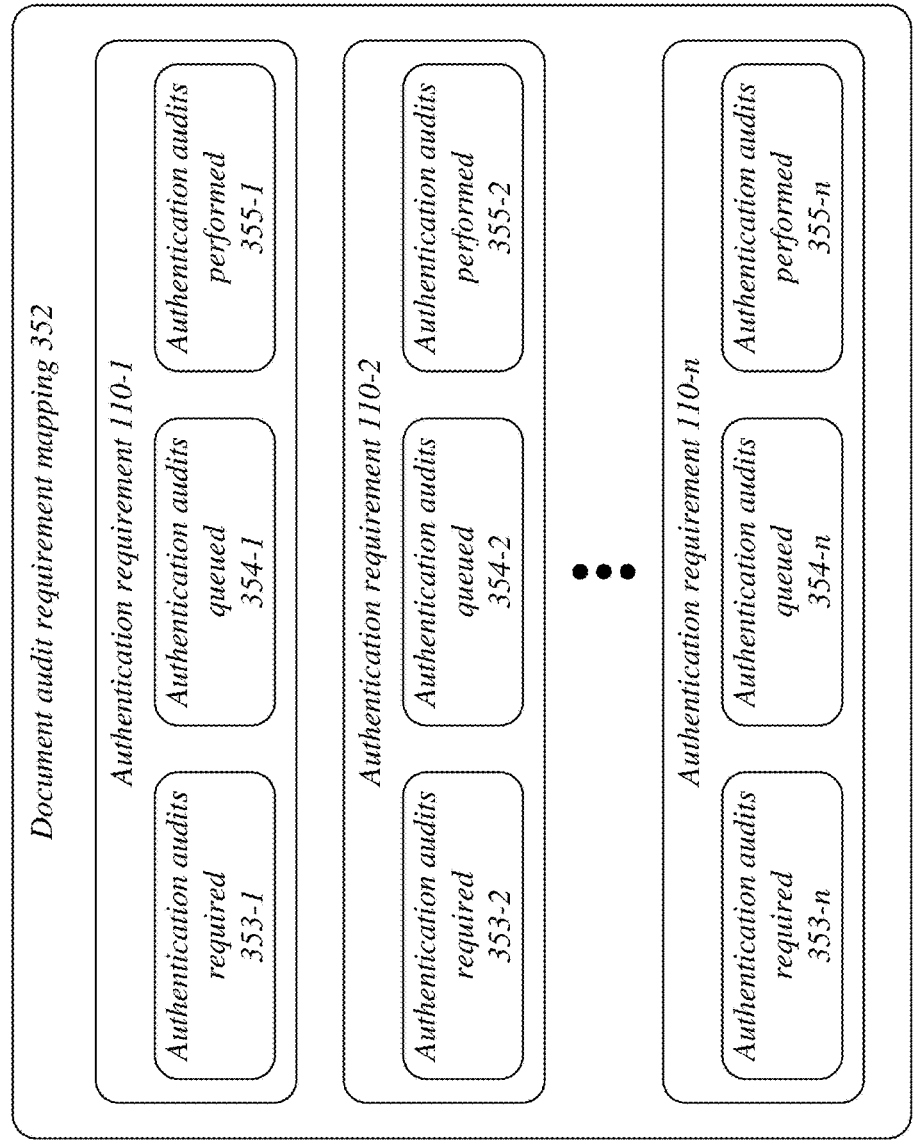
FIG. 3B illustrates exemplary aspects of a document audit requirement mapping according to one or more embodiments described herein.

FIG. 3B illustrates exemplary aspects of document audit requirement mapping 352 in environment 300B, according to one or more embodiments described herein. In many embodiments, document audit requirement mapping 352 may include data to track each of the one or more authentication requirements 110-1, 110-2, 110-*n* in master set 108. For example, as shown in environment 300B, document audit requirement mapping 352 may be used to track/monitor one or more of authentication audits required 353-1, authentication audits queued 354-1, and authentication audits performed 355-1 with respect to authentication requirement 110-1. Similarly, document audit requirement mapping 352 may be used to track/monitor one or more of authentication audits required 353-2, authentication audits queued 354-2, and authentication audits performed 355-2 with respect to authentication requirement 110-2 and one or more of authentication audits required 353-*n*, authentication audits queued 354-*n*, and authentication audits performed 355-*n* with respect to authentication requirement 110-*n*. In one or more embodiments, document audit requirement mapping 352 may be created and/or edited by audit platform 101 as part of generating an audit queue as described herein. In various embodiments, document audit requirement mapping 352 may be stored with and/or as part of the audit parameters set 102, such as locally by the audit platform 101. Embodiments are not limited in this context.

Figure 4B:
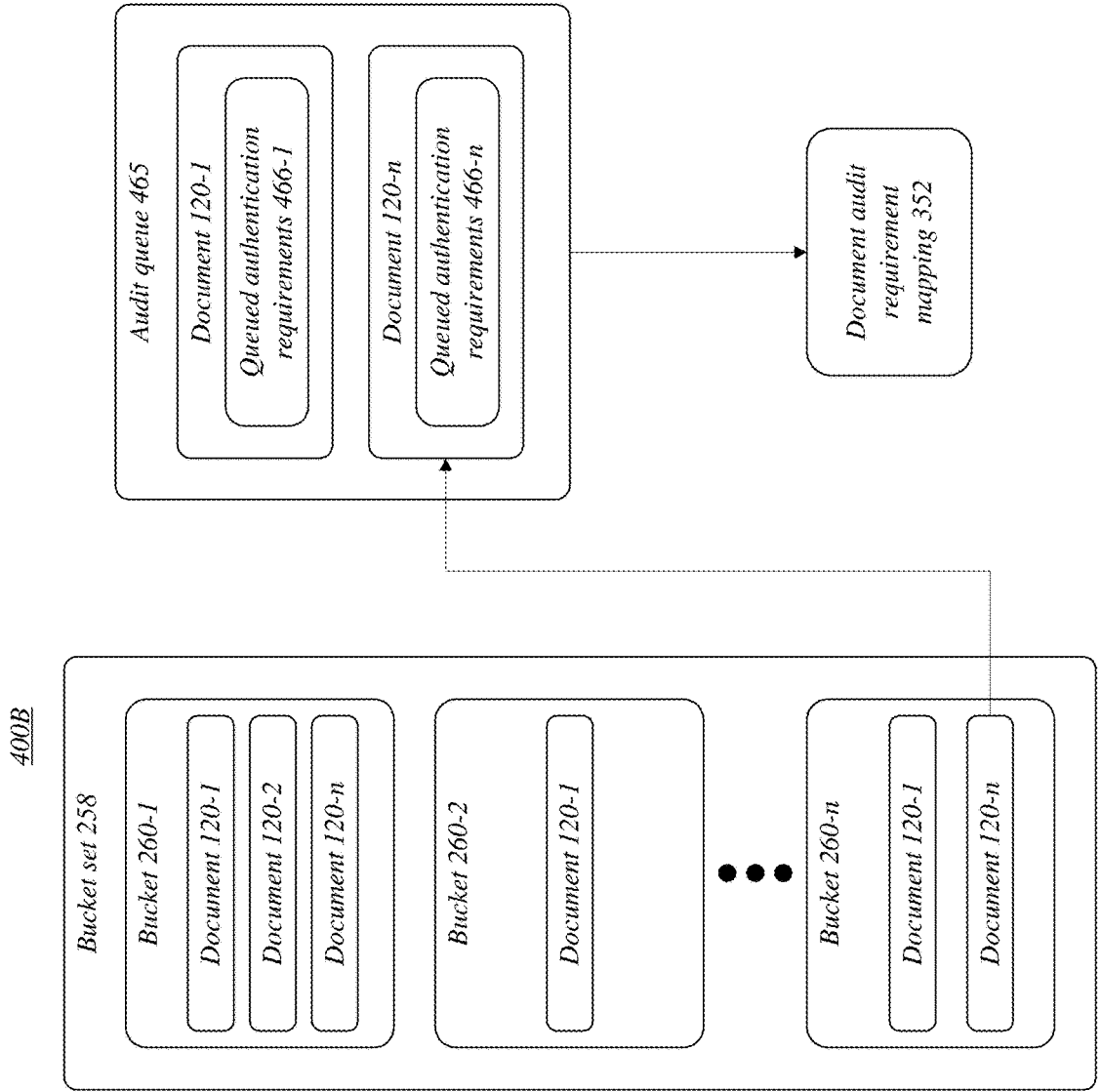
Figure 4C:
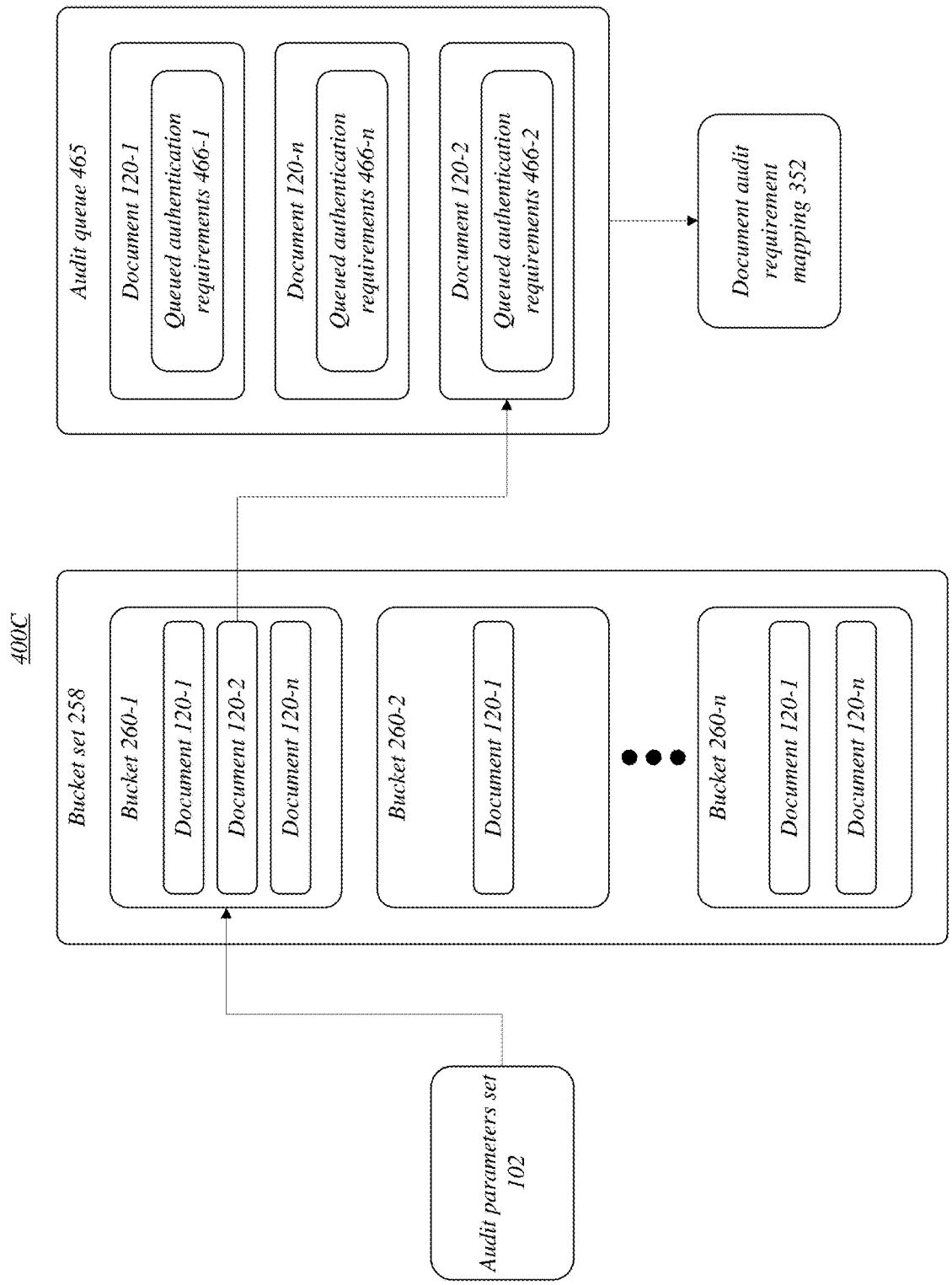

FIG. 4A, FIG. 4B, and FIG. 4C illustrate exemplary aspects of generating an audit queue 465 and updating document audit requirement mapping 352, such as with audit platform 101, in environments 400A, 400B, and 400C. In environment 400A, document 120-1 and queued authentication requirements 466-1, or indications thereof, may be added to audit queue 465 based on audit parameters set 102 and bucket set 258 and document audit requirement mapping 352 may be updated to reflect the additions to audit queue 465. In environment 400B, document 120-*n* and queued authentication requirements 466-*n*, or indications thereof, may be added to audit queue 465 based on audit parameters set 102 and bucket set 258 and document audit requirement mapping 352 may be updated to reflect the additions to the audit queue 465. In environment 400C, document 120-2 and queued authentication requirements 466-2, or indications thereof, may be added to audit queue 465 based on audit parameters set 102 and bucket set 258 and document audit requirement mapping 352 may be updated to reflect the additions to the audit queue 465. In one or more embodiments described herein, this may enable generation of an optimized audit queue with desired audit coverage characteristics. Embodiments are not limited in this context.

Referring specifically to environment 400A, audit parameters set 102 may be used, such as by audit platform 101, to identify bucket 260-*n* as corresponding to the highest priority authentication requirement (e.g., authentication requirement 110-*n*). For instance, this determination may be based on one or more of the respective corresponding priority 130, audit percentage 132, audit rule set 138, and baseline set 144 in audit parameters set 102. In some embodiments, one or more of audit parameters set 102, bucket set 258, audit queue 465, and document audit requirement mapping 352 may be stored locally to audit platform 101, such as in a computer-readable storage medium of audit platform 101. After identifying bucket 260-*n* as the highest priority bucket in bucket set 258, document 120-1 (i.e., the document at the top of bucket 260-*n* or with the highest priority), or an indication thereof, may be added to audit queue 465 with one or more queued authentication requirements 466-1 that correspond to one or more of the requisite authentication requirements of document 120-1. In several embodiments, once document 120-1 and the one or more queued authentication requirements 466-1 are added to audit queue 465, document audit requirement mapping 352 may be updated, such as by updating one or more of authentication audits required 353-1, 353-2, 353-*n*, authentication audits queued 354-1, 354-2, 354-*n*, and authentication audits performed 355-1, 355-2, 355-*n*.

Referring specifically to environment 400B, document 120-*n* and one or more queued authentication requirements 466-*n* associated with requisite authentication requirements 110-*n* may be added to audit queue 465. For instance, this may be in response to a determination, such as by audit platform 101, that audit coverage requirements associated with the authentication requirement corresponding to bucket 260-*n* was not satisfied by adding document 120-1 and queued authentication requirements 466-1 to authentication queue 465. In many embodiments, document 120-*n* may be the document in bucket 260-*n* with the second most associated requisite authentication requirements, next to document 120-1. In several embodiments, once document 120-*n* and the one or more queued authentication requirements 466-*n* are added to audit queue 465, document audit requirement mapping 352 may be updated, such as by updating one or more of authentication audits required 353-1, 353-2, 353-*n*, authentication audits queued 354-1, 354-2, 354-*n*, and authentication audits performed 355-1, 355-2, 355-*n*.

Referring specifically to environment 400C, document 120-2 and one or more queued authentication requirements 466-2 associated with requisite authentication requirements 110-2 may be added to audit queue 465. For instance, this may be in response to a determination, such as by audit platform 101, that audit coverage requirements associated with the authentication requirement corresponding to bucket 260-*n* was satisfied by adding document 120-*n* and queued authentication requirements 466-*n* to authentication queue 465. In many embodiments, audit parameters set 102 may identify bucket 260-1 as corresponding to the next highest priority authentication requirement below bucket 260-*n*. Accordingly, the document (e.g., document 120-2) with the highest priority in bucket 260-1 that has not already been added to audit queue 465 is added along with one or more queued authentication requirements 466-2 corresponding to requisite authentication requirements associated with document 120-2.

In several embodiments, once document 120-2 and the one or more queued authentication requirements 466-2 are added to audit queue 465, document audit requirement mapping 352 may be updated, such as by updating one or more of authentication audits required 353-1, 353-2, 353-*n*, authentication audits queued 354-1, 354-2, 354-*n*, and authentication audits performed 355-1, 355-2, 355-*n*. In one or more embodiments described herein, these, or similar, processes may be repeated until audit queue 465 satisfies, or as closely as possible satisfies, document audit requirement mapping 352. As previously mentioned, any audit coverage requirements not satisfied by audit queue 465 may be tracked, such as in document audit requirement mapping 352 or audit rules in corresponding authentication requirements, such that they can be achieved to the extent possible in subsequent audit queues generated on subsequent document batches.

Figure 5A:
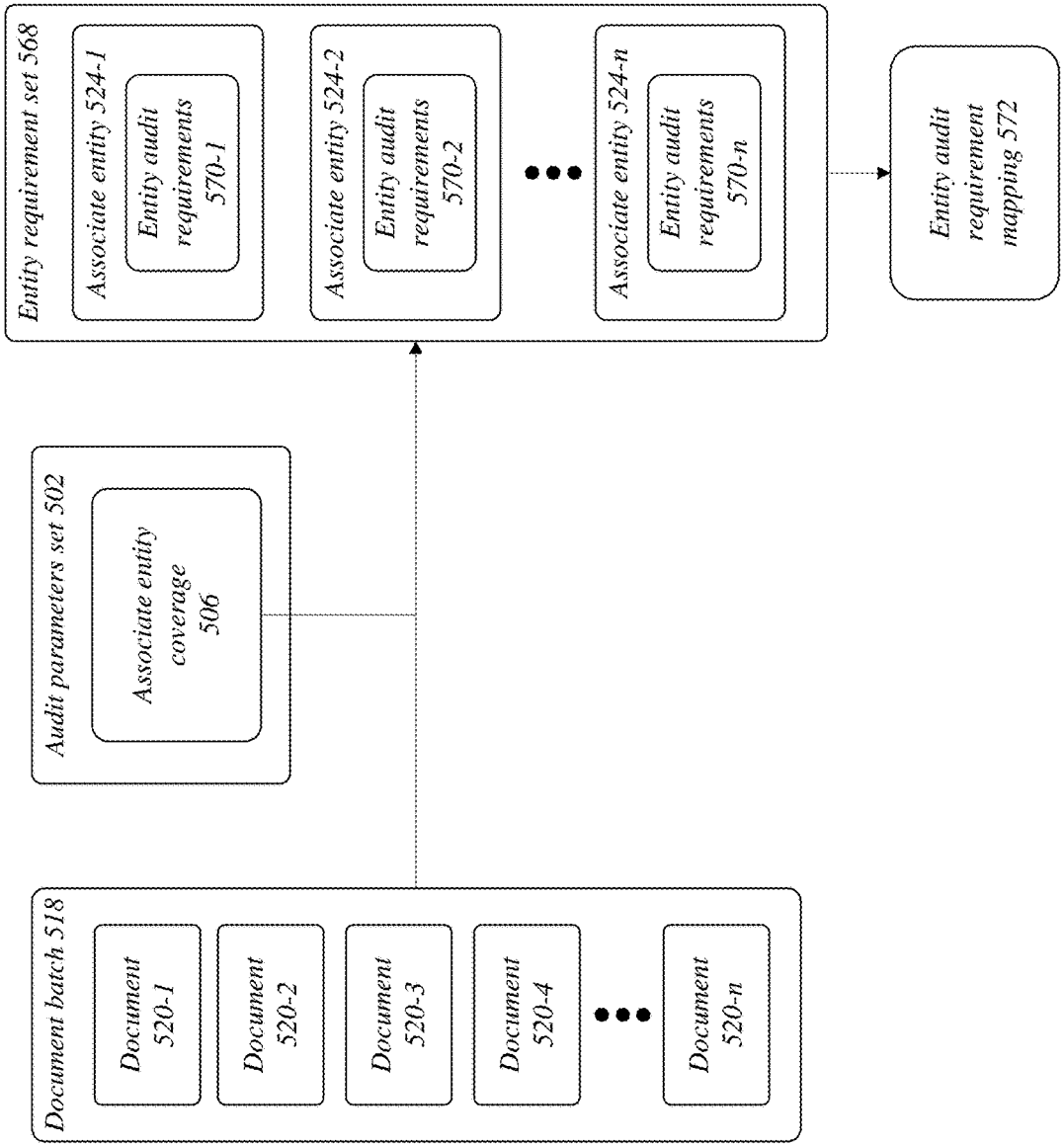
FIG. 5A illustrates exemplary aspects of generating an entity audit requirement mapping according to one or more embodiments described herein.

FIG. 5A illustrates exemplary aspects of generating an entity audit requirement mapping 572, such as with audit platform 101, in an environment 500A according to one or more embodiments described herein. In one or more embodiments described herein, a document batch 518 may be utilized in conjunction with audit parameters set 502 including associate entity coverage 506 to identify an entity requirement set 568 with one or more entity audit requirements 570-1, 570-2, 570-*n* for each of one or more associate entities 524-1, 524-2, 524-*n*. In various embodiments, the entity audit requirement mapping 572 may be generated based on the entity requirement set 368 to track the status of each of the entity audit requirement 570-1, 570-2, 570-*n* during construction of an audit queue. It will be appreciated that in some embodiments, entity audit requirement mapping 572 may be combined with document audit requirement mapping 352. Further it will be appreciated that one or more aspects of document batch 518 and audit parameters set 502 may be the same or similar to document batch 118 and audit parameters set 102. Embodiments are not limited in this context.

Figure 5B:
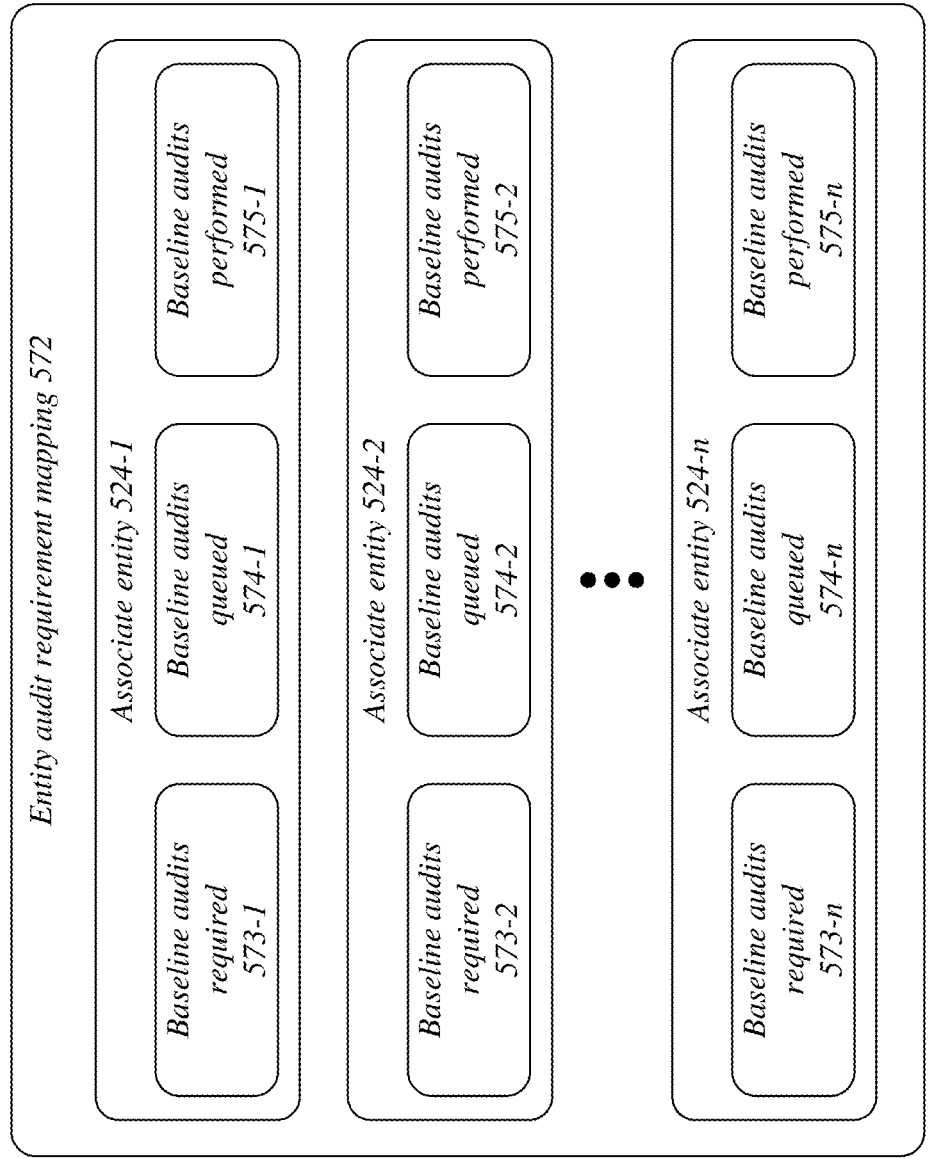
FIG. 5B illustrates exemplary aspects of an entity audit requirement mapping according to one or more embodiments described herein.

FIG. 5B illustrates exemplary aspects of entity audit requirement mapping 572 in environment 500B, according to one or more embodiments described herein. In many embodiments, entity audit requirement mapping 572 may include data to track each of the associate entity coverages 506 in audit parameters set 502. For example, as shown in environment 500B, entity audit requirement mapping 572 may be used to track/monitor one or more of baseline audits required 573-1, baseline audits queued 574-1, and authentication audits performed 575-1 with respect to associate entity 524-1. Similarly, entity audit requirement mapping 572 may be used to track/monitor one or more of authentication audits required 573-2, authentication audits queued 574-2, and authentication audits performed 575-2 with respect to associate entity 524-2 and one or more of authentication audits required 573-*n*, authentication audits queued 574-*n*, and authentication audits performed 575-*n* with respect to associate entity 524-*n*. In one or more embodiments, entity audit requirement mapping 572 may be created and/or edited by audit platform 101 as part of generating an audit queue as described herein. In various embodiments, entity audit requirement mapping 572 may be stored with and/or as part of the audit parameters set 502, such as locally by the audit platform 101. Embodiments are not limited in this context.

Figure 6A:
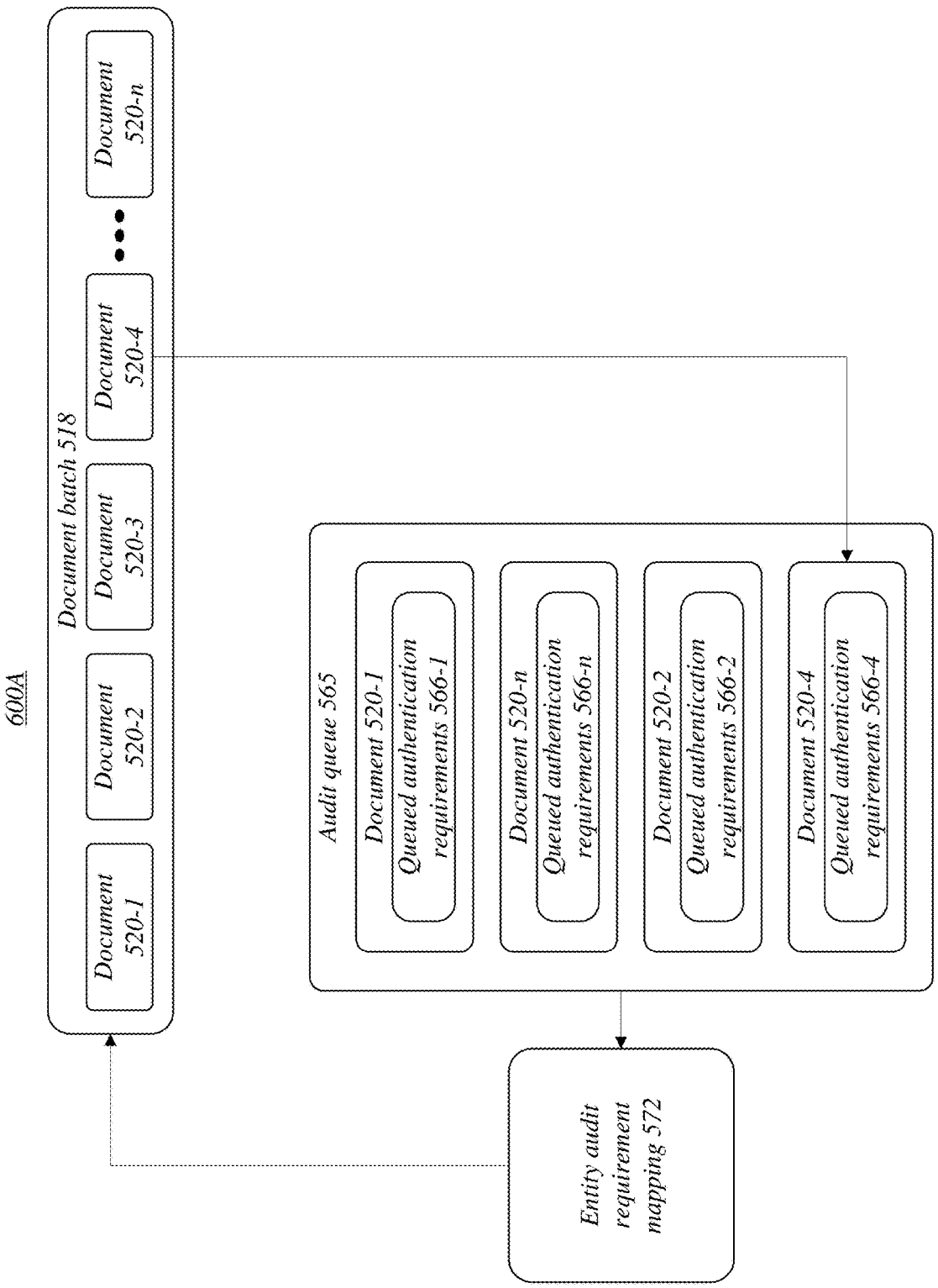

FIG. 6A and FIG. 6B illustrate exemplary aspects of generating an audit queue 565 and updating entity audit requirement mapping 572, such as with audit platform 101, in environments 600A, 600B. In environment 600A, documents 520-1, 520-*n*, 520-2 along with queued authentication requirements 566-1, 566-*n*, 566-2 may have been previously added to audit queue 565. For example, documents 520-1, 520-*n*, 520-2 along with queued authentication requirements 566-1, 566-*n*, 566-2 may have been previously added to audit queue 565 as part of satisfying a document audit requirement mapping (e.g., document audit requirement mapping 352). In one or more embodiments, it may be determined that one or more aspects of associate entity coverage 506 of audit parameter set 502 are not satisfied by audit queue 565 based on entity audit requirement mapping 572. In one or more such embodiments, in response, document 520-4 and queued authentication requirements 566-4, or representations thereof may be added to audit queue 565 and entity audit requirement mapping 572 may be updated. In environment 600B, it may be determined audit queue 565 still does not satisfy all aspects of entity audit requirement mapping 575. Accordingly, document 520-3 and queued authentication requirements 566-3, or representations thereof may be added to audit queue 565 and entity audit requirement mapping 572 may be updated. Embodiments are not limited in this context.

Referring specifically to environment 600A. In one or more embodiments, it may be determined that one or more aspects of associate entity coverage 506 of audit parameter set 502 are not satisfied by audit queue 565. For instance, baseline audits required 573-2 for associate entity 524-2 may not be satisfied by audit queue 565. Accordingly, document 520-4 and queued authentication requirements 566-4 that are associated with associate entity 524-2 may be added to audit queue 565 from document batch 518 based on entity audit requirement mapping 572. In several embodiments, document 540-4 may be the document not already included in audit queue 565 with the most requisite funding requirements or baselines that correspond to the associate entity 524-2. In several embodiments, once document 520-4 and the one or more queued authentication requirements 566-4 are added to audit queue 565, entity audit requirement mapping 572 may be updated, such as by updating one or more of baseline audits required 573-1, 573-2, 573-*n*, entity audits queued 574-1, 574-2, 574-*n*, and entity audits performed 575-1, 575-2, 575-*n*.

Referring specifically to environment 600B, document 520-3 and one or more queued authentication requirements 566-3 associated with the associate entity 524-2 may be added to audit queue 565. For instance, this may be in response to a determination, such as by audit platform 101, that entity coverage requirements associated with the associate entity 524-2 remain unsatisfied after adding document 520-4 and queued authentication requirements 566-4 to authentication queue 565. In many embodiments, document 520-3 may be the document with the second most associated requisite authentication requirements corresponding to associate entity 524-2, next to document 520-4.

In several embodiments, once document 520-3 and the one or more queued authentication requirements 566-3 are added to audit queue 565, document audit requirement mapping 572 may be updated, such as by updating one or more of entity audits requirements 573-1, 573-2, 573-*n*, entity audits queued 574-1, 574-2, 574-*n*, and entity audits performed 575-1, 575-2, 575-*n*. In one or more embodiments described herein, these, or similar, processes may be repeated until audit queue 565 satisfies, or as closely as possible satisfies, entity audit requirement mapping 572. As previously mentioned, any audit coverage requirements not satisfied by audit queue 565 may be tracked, such as in document audit requirement mapping 572 or audit parameters set 502, such that they can be achieved to the extent possible in subsequent audit queues generated on subsequent document batches.

Figure 7A:
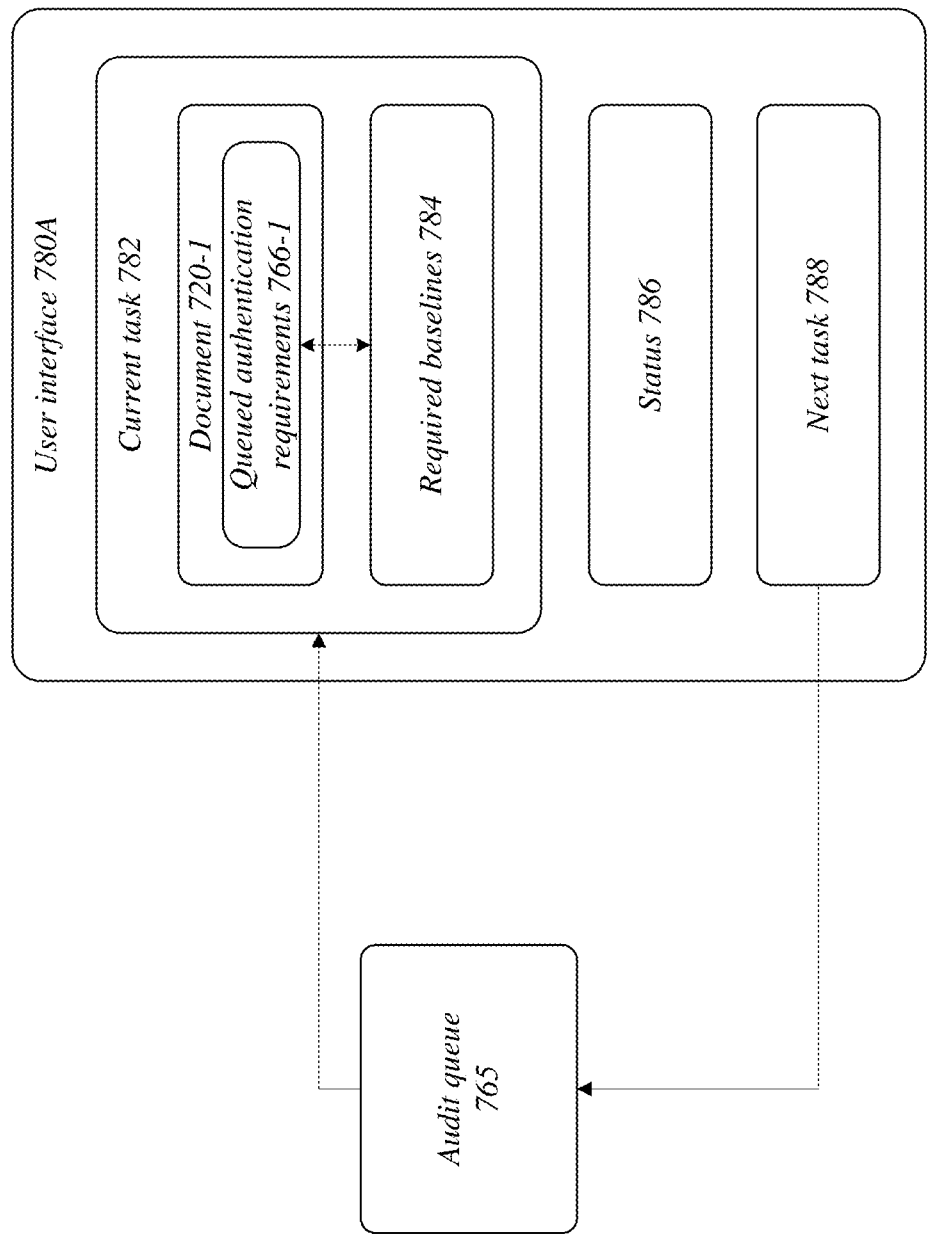
FIG. 7A, FIG. 7B, and FIG. 7C illustrate exemplary aspects of user interfaces according to one or more embodiments described herein.
Figure 7B:
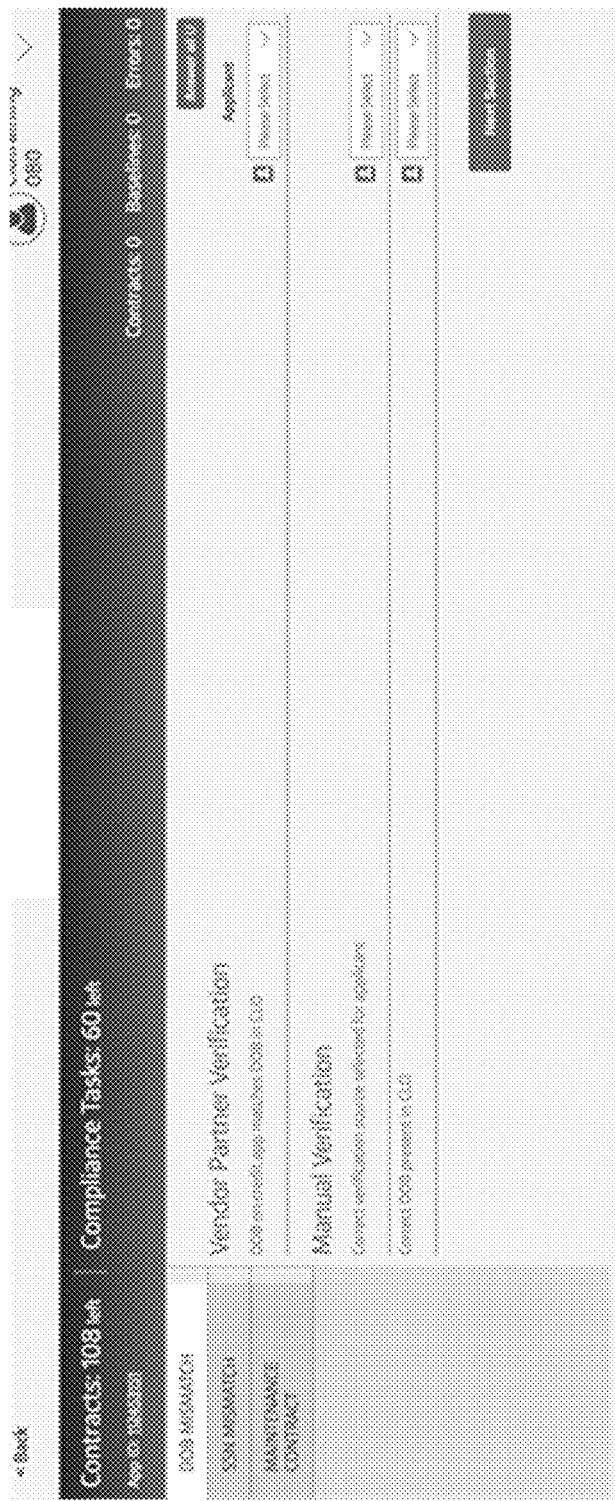
Figure 7C:
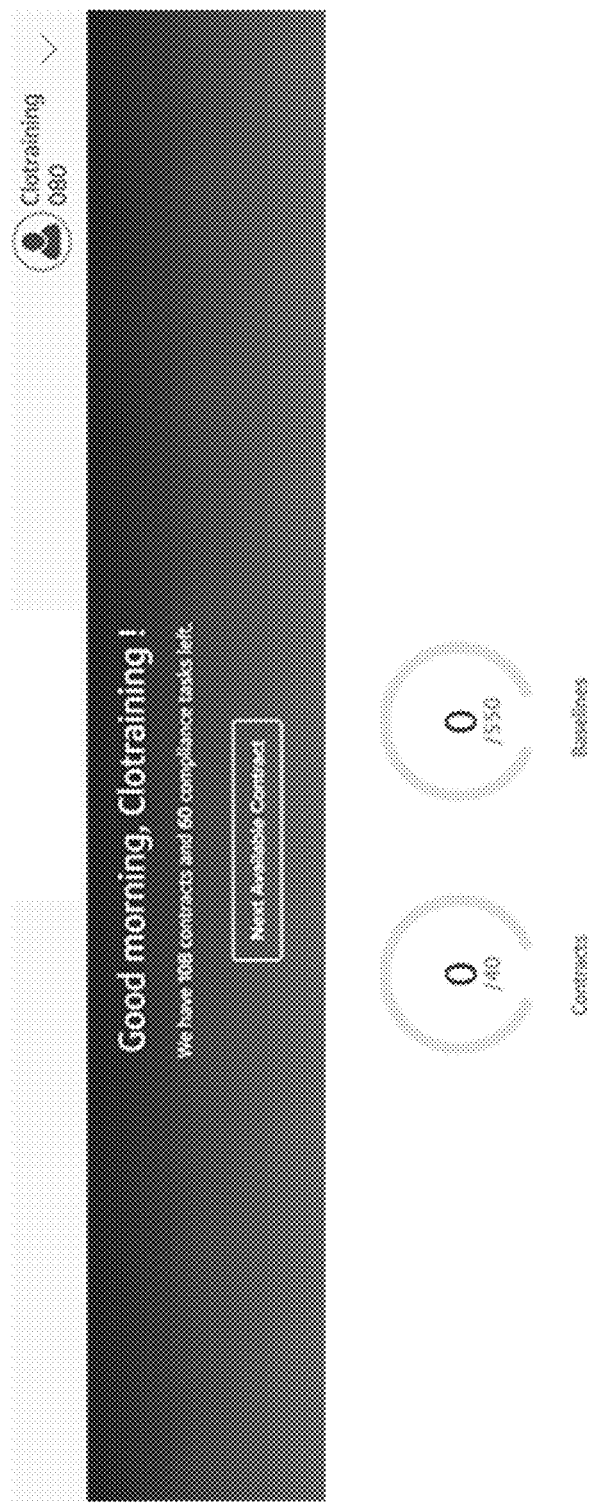

FIG. 7A, FIG. 7B, and FIG. 7C illustrate exemplary aspects of user interfaces 780A, 780B, 780C in environments 700A, 700B, 700C. In environment 700A, the user interface 780A may be utilized, such as by audit platform 101, to facilitate and/or assist in presentation and/or performance of audit queue 765. In some embodiments, audit platform 101 may gather resources and/or present resources via one or more of user interfaces 780A, 780B, 780C to assist in presentation and/or performance of audit queue 765. User interface 780A may include current task 782, status 786, and next task 788. In various embodiments, current task 782 may present a document 720-1 currently up for audit. In many embodiments, the document 720-1 may be presented along with queued authentication requirements 766-1 associated with or included in document 720-1 and required baselines 784 associated with the queued authentication requirements. In some embodiments, status 786 may present the state of completion of the audit queue 765. In various embodiments, next task 788 may enable the next task in audit queue 765 to be identified and/or presented on user interface 180A as the current task 782. In many embodiments, user interface 780B of environment 700B may illustrate presentation of one or more aspects of user interface 780A, such as components of current task 782, document 720-1, queued authentication requirements 766-1, requirement baselines 766-1, status 786, and next task 788 In several embodiments, user interface 780C of environment 700C may illustrate presentation of one or more of status 786 and next task 788. In some embodiments, separate user interfaces or views may be provided for different users with different access/visibility requirements, such as auditors and managers. Embodiments are not limited in this context.

FIG. 8 illustrates exemplary aspects of a system architecture 801 in environment 800 according to one or more embodiments described herein. In many embodiments, one or more components of system architecture 801 may be used to implement audit platform 101. In some embodiments, system architecture 801 may utilize one or more components of a quality assurance architecture and/or software. In various embodiments, system architecture 801 may include one or more of client 803, service 805, eAPIs 807, server 813, authorizer 833, databases 825, 827, 831, 835, and cloud 829. In several embodiments, eAPI may refer to an extensible operating system (EOS) application programming interface (API). In the illustrated embodiment, eAPIs 807 includes user eAPI 809 and audit eAPI 811 and server 813 includes monitor 815, audit reporting 817, data providers 819, inventory searcher 821, and authenticator 823. In some embodiments, components of system architecture 801 may be combined or separated without departing from the scope of this disclosure. For instance, data stored in database 825 and database 831 may be stored in a single database. In another instance, components of server 813 may be hosted on one or more separate servers. Embodiments are not limited in this context.

In various embodiments, a client 803 may log into the service 805 to access the audit platform. For instance, client 803 may include a user facing interface, such as one or more of user interfaces 780A, 780B, 780C. In many embodiments, the service 805 may include an orchestration layer. In many such embodiments, the service 805 may include components to collect information through various backend servers or databases. For example, a user may provide login credentials to service 805 via client 803. In such examples, service 805 may route the login credentials to authenticator 823 of server 813 for verification, such as via one or more of authorizer 833, database 825, and database 835.

In several embodiments, eAPIs 807 may include user eAPI 809 and audit eAPI 811. In various embodiments, user eAPI 809 may be used for accessing/manipulating/storing data in database 825 and audit eAPI 811 may be used for accessing/manipulating/storing data in database 827. In database 825, data associated with completed documents may be stored. For instance, if the documents are loan applications, then data associated with funded loan applications, such as the applications themselves, may be stored here. In some embodiments, documents for audit (e.g., ones added to an audit queue) may be stored in data base 825. In database 827, data associated with audit documents may be stored. For example, audit results may be stored in database 827.

In one or more embodiments, monitor 815 may be used to gather document batches, such as from database 825. In some embodiments, monitor 815 may be used to generate audit queues based on document batches. For example, monitor 815 may gather document batches via data providers 819 based on a date or date range. In such examples, the date or date range may be submitted to server 805 via client 803. In various embodiments, audit reporting 817 may cause completed audits to be reported to and/or stored in one or more of database 827 and cloud 829. In some embodiments, cloud 829 may be a reporting authority, such as a government entity. In many embodiments, inventory searcher 821 may be used to search and or identify documents with certain characteristics. In one or more embodiments, data may be indexed and/or stored in database 831 to support the search functions of inventory searcher 821.

In various embodiments, one or more aspects or components of audit platform 101 and/or system architecture 801 may utilize a storage medium. In some embodiments the storage medium may comprise any non-transitory computer-readable storage medium or machine-readable storage medium, such as an optical, magnetic or semiconductor storage medium. In various embodiments, the storage medium may comprise an article of manufacture. In some embodiments, the storage medium may store computer-executable instructions, such as computer-executable instructions to implement one or more components, aspects, or procedures described herein. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 9:
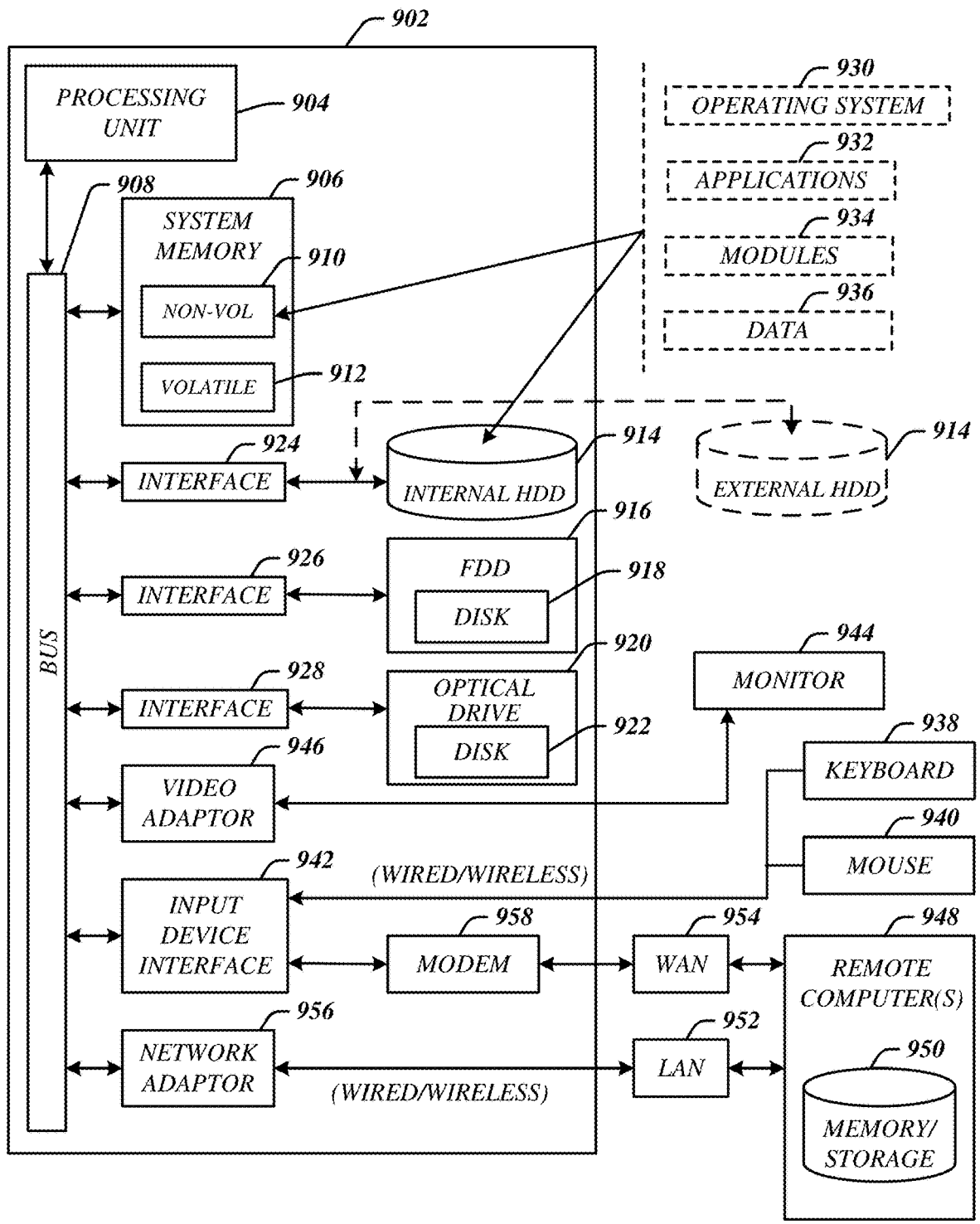
FIG. 9 illustrates exemplary aspects of a computing architecture according to one or more embodiments described herein.

FIG. 9 illustrates an embodiment of an exemplary computing architecture 900 that may be suitable for implementing various embodiments as previously described. In various embodiments, the computing architecture 900 may comprise or be implemented as part of an electronic device. In some embodiments, the computing architecture 900 may be representative, for example, of a computer system that implements one or more components described herein. In some embodiments, computing architecture 900 may be representative, for example, one or more portions of audit platform 101 or system architecture 801 that implement one or more embodiments described herein. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 900. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 900 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 900.

As shown in FIG. 9, the computing architecture 900 comprises a processing unit 904, a system memory 906 and a system bus 908. The processing unit 904 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multiprocessor architectures may also be employed as the processing unit 904.

The system bus 908 provides an interface for system components including, but not limited to, the system memory 906 to the processing unit 904. The system bus 908 can be any of several types of bus structure that may further interconnect to a memory bus (with or without a memory controller), a peripheral bus, and a local bus using any of a variety of commercially available bus architectures. Interface adapters may connect to the system bus 908 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 906 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 9, the system memory 906 can include non-volatile memory 910 and/or volatile memory 912. A basic input/output system (BIOS) can be stored in the non-volatile memory 910.

The computer 902 may include various types of computer-readable storage media in the form of one or more lower speed memory units, including an internal (or external) hard disk drive (HDD) 914, a magnetic floppy disk drive (FDD) 916 to read from or write to a removable magnetic disk 918, and an optical disk drive 920 to read from or write to a removable optical disk 922 (e.g., a CD-ROM or DVD). The HDD 914, FDD 916 and optical disk drive 920 can be connected to the system bus 908 by a HDD interface 924, an FDD interface 926 and an optical drive interface 928, respectively. The HDD interface 924 for external drive implementations can include at least one or both of Universal Serial Bus (USB) and IEEE 994 interface technologies.

The drives and associated computer-readable media provide volatile and/or nonvolatile storage of data, data structures, computer-executable instructions, and so forth. For example, a number of program modules can be stored in the drives and memory units 910, 912, including an operating system 930, one or more application programs 932, other program modules 934, and program data 936. In one embodiment, the one or more application programs 932, other program modules 934, and program data 936 can include, for example, the various applications and/or components described herein.

A user can enter commands and information into the computer 902 through one or more wire/wireless input devices, for example, a keyboard 938 and a pointing device, such as a mouse 940. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 904 through an input device interface 942 that is coupled to the system bus 908, but can be connected by other interfaces such as a parallel port, IEEE 994 serial port, a game port, a USB port, an IR interface, and so forth.

A monitor 944 or other type of display device is also connected to the system bus 908 via an interface, such as a video adaptor 946. The monitor 944 may be internal or external to the computer 902. In addition to the monitor 944, a computer typically includes other peripheral output devices, such as speakers, printers, and so forth.

The computer 902 may operate in a networked environment using logical connections via wire and/or wireless communications to one or more remote computers, such as a remote computer 948. In various embodiments, one or more migrations may occur via the networked environment. The remote computer 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wire/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet.

When used in a LAN networking environment, the computer 902 is connected to the LAN 952 through a wire and/or wireless communication network interface or adaptor 956. The adaptor 956 can facilitate wire and/or wireless communications to the LAN 952, which may also include a wireless access point disposed thereon for communicating with the wireless functionality of the adaptor 956.

When used in a WAN networking environment, the computer 902 can include a modem 1358, or is connected to a communications server on the WAN 1354, or has other means for establishing communications over the WAN 954, such as by way of the Internet. The modem 958, which can be internal or external and a wire and/or wireless device, connects to the system bus 908 via the input device interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 10:
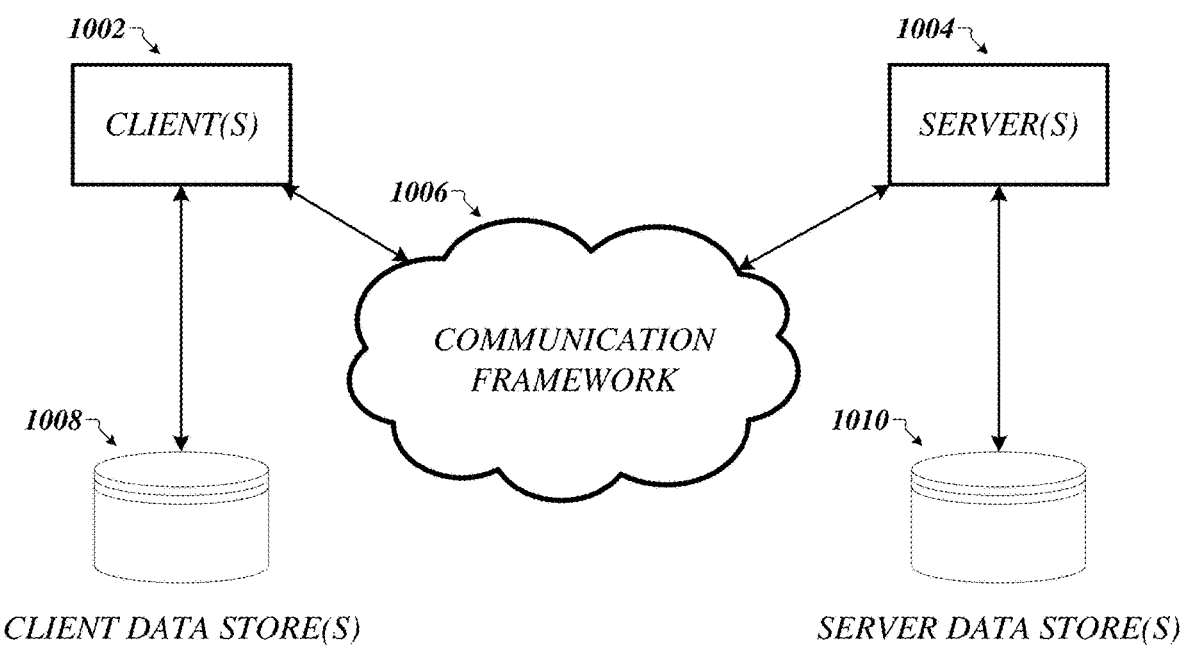
FIG. 10 illustrates exemplary aspects of a communications architecture according to one or more embodiments described herein.

FIG. 10 illustrates a block diagram of an exemplary communications architecture 1000 suitable for implementing various embodiments as previously described, such as virtual machine migration. The communications architecture 1000 includes various common communications elements, such as a transmitter, receiver, transceiver, radio, network interface, baseband processor, antenna, amplifiers, filters, power supplies, and so forth. The embodiments, however, are not limited to implementation by the communications architecture 1000.

As shown in FIG. 10, the communications architecture 1000 comprises includes one or more clients 1002 and servers 1004. The clients 1002 and the servers 1004 are operatively connected to one or more respective client data stores 1008 and server data stores 1010 that can be employed to store information local to the respective clients 1002 and servers 1004, such as cookies and/or associated contextual information. In various embodiments, any one of servers 1004 may implement one or more of logic flows or operations described herein, and storage mediums described herein, such as in conjunction with storage of data received from any one of clients 1002 on any of server data stores 1010.

The clients 1002 and the servers 1004 may communicate information between each other using a communication framework 1006. The communications framework 1006 may implement any well-known communications techniques and protocols. The communications framework 1006 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1006 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1900 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1002 and the servers 1004. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

The invention claimed is:

1. An apparatus, comprising:
a processor; and
a memory comprising instructions for an audit platform that when executed by the processor cause the processor to:
identify a set of audit parameters comprising a master set of authentication requirements and a date range, wherein each authentication requirement in the master set of authentication requirements is associated with a priority, an audit percentage, one or more audit rules, and one or more baselines;
communicate with a first database to determine a document batch from a plurality of documents in the first database based on the date range, the document batch for analysis to generate an audit queue for audit of the document batch, wherein each document in the document batch includes one or more requisite authentication requirements and each of the one or more requisite authentication requirements corresponds to an associate entity, and wherein each of the one or more requisite authentication requirements corresponds to one of the authentication requirements from the master set of authentication requirements;
calculate one or more document audit requirements for each authentication requirement in the master set based on the document batch and the set of audit parameters;
generate a document audit requirement mapping for the document batch based on the one or more document audit requirements for each authentication requirement in the master set;
create a set of buckets comprising a bucket that corresponds to each authentication requirement in the master set of authentication requirements;
sort the document batch by authentication requirements with the set of buckets, wherein a document with multiple requisite authentication requirements is sorted into a corresponding multiple of buckets;
select a first bucket from the set of buckets based on the set of audit parameters;
identify a first document sorted into the first bucket, wherein the first document comprises the document with a largest number of authentication requirements in the first bucket;
store the first document to the audit queue in a first in, first out (FIFO) manner;
update the document audit requirement mapping based on the authentication requirements associated with the first document and addition of the first document to the audit queue;
determine a first document audit requirement associated with the first bucket is unsatisfied based on the document audit requirement mapping;
identify a second document sorted into the first bucket, wherein the second document comprises the document with a second largest number of authentication requirements in the first bucket;
store the second document to the audit queue in the FIFO manner;
update the document audit requirement mapping based on the authentication requirements associated with the second document and addition of the second document to the audit queue;
determine the first document audit requirement associated with the first bucket is satisfied; and communicate with a second database to make at least a portion of the audit queue accessible by a client, wherein communication with the second database includes at least a portion of data in the document batch obtained from the first database.

2. The apparatus of claim 1, the memory comprising instructions that when executed by the processor cause the processor to:
select a second bucket from the set of buckets based on the set of audit parameters;
identify a third document in the second bucket, wherein the third document comprises the document with a largest number of authentication requirements in the second bucket that is not already in the audit queue;
add the third document to the audit queue in the FIFO manner;
update the document audit requirement mapping based on the authentication requirements associated with the third document and addition of the third document to the audit queue; and
determine a second document audit requirement associated with the second bucket is satisfied based on the document audit requirement mapping.

3. The apparatus of claim 1, the audit queue comprising an ordered list of one or more documents in the document batch to audit to satisfy the one or more document audit requirements for each authentication requirement in the master set.

4. The apparatus of claim 1, the memory comprising instructions that when executed by the processor cause the processor to:
calculate one or more entity audit requirements for each associate entity corresponding to one or more documents in the document batch based on the document batch and the set of audit parameters;
determine a first entity audit requirement unsatisfied by the audit queue, the first entity audit requirement corresponding to a first associate entity; and
add a first document corresponding to the first entity audit requirement and the first associate entity to the audit queue from the document batch based on the first entity audit requirement being unsatisfied.

5. The apparatus of claim 4, the memory comprising instructions that when executed by the processor cause the processor to:
determine the first entity audit requirement remains unsatisfied after adding the first document to the audit queue;
add a second document corresponding to the first entity audit requirement and the first associate entity to the audit queue from the document batch based on the first entity audit requirement being unsatisfied after adding the first document to the audit queue; and
determine the first entity audit requirement is satisfied after adding the second document to the audit queue.

6. The apparatus of claim 1, wherein selection of the first bucket from the set of buckets is based on the document batch and the priorities in the set of audit parameters.

7. The apparatus of claim 1, wherein calculation of the one or more document audit requirements for each authentication requirement in the master set is based on the document batch, the one or more audit percentages in the set of audit parameters, and the one or more audit rules in the set of audit parameters.

8. The apparatus of claim 1, wherein each document in the document batch comprises a loan application and the master set of authentication requirements includes one or more of proof of income, proof of residence, gap insurance, service contract, and social security number.

9. At least one non-transitory computer-readable medium comprising a set of instructions that, in response to being executed by a processor circuit, cause the processor circuit to:
identify a set of audit parameters comprising a master set of authentication requirements and a date range, wherein each authentication requirement in the master set of authentication requirements is associated with a priority, an audit percentage, one or more audit rules, and one or more baselines;
communicate with a first database to determine a document batch from a plurality of documents in the first database based on the date range, the document batch for analysis to generate an audit queue for audit of the document batch, wherein each document in the document batch includes one or more requisite authentication requirements and each of the one or more requisite authentication requirements corresponds to an associate entity, and wherein each of the one or more requisite authentication requirements corresponds to one of the authentication requirements from the master set of authentication requirements;
calculate one or more document audit requirements for each authentication requirement in the master set based on the document batch and the set of audit parameters;
generate a document audit requirement mapping for the document batch based on the one or more document audit requirements for each authentication requirement in the master set;
create a set of buckets comprising a bucket that corresponds to each authentication requirement in the master set of authentication requirements;
sort the document batch by authentication requirements with the set of buckets, wherein a document with multiple requisite authentication requirements is sorted into a corresponding multiple of buckets;
select a first bucket from the set of buckets based on the set of audit parameters;
identify a first document sorted into the first bucket, wherein the first document comprises the document with a largest number of authentication requirements in the first bucket;
store the first document to the audit queue in a first in, first out (FIFO) manner;
update the document audit requirement mapping based on the authentication requirements associated with the first document and addition of the first document to the audit queue;
determine a first document audit requirement associated with the first bucket is unsatisfied based on the document audit requirement mapping;
identify a second document sorted into the first bucket, wherein the second document comprises the document with a second largest number of authentication requirements in the first bucket;
store the second document to the audit queue in the FIFO manner;
update the document audit requirement mapping based on the authentication requirements associated with the second document and addition of the second document to the audit queue;
determine the first document audit requirement associated with the first bucket is satisfied; and
communicate with a second database to make at least a portion of the audit queue accessible by a client, wherein communication with the second database includes at least a portion of data in the document batch obtained from the first database.

10. The at least one non-transitory computer-readable medium of claim 9, comprising instructions that, in response to being executed by the processor circuit, cause the processor circuit to:
select a second bucket from the set of buckets based on the set of audit parameters;
identify a third document in the second bucket, wherein the third document comprises the document with a largest number of authentication requirements in the second bucket that is not already in the audit queue;
add the third document to the audit queue in the FIFO manner;
update the document audit requirement mapping based on the authentication requirements associated with the third document and addition of the third document to the audit queue; and
determine a second document audit requirement associated with the second bucket is satisfied based on the document audit requirement mapping.

11. The at least one non-transitory computer-readable medium of claim 9, the audit queue comprising an ordered list of one or more documents in the document batch to audit to satisfy the one or more document audit requirements for each authentication requirement in the master set.

12. The at least one non-transitory computer-readable medium of claim 9, comprising instructions that, in response to being executed by the processor circuit, cause the processor circuit to:
calculate one or more entity audit requirements for each associate entity corresponding to one or more documents in the document batch based on the document batch and the set of audit parameters;
determine a first entity audit requirement unsatisfied by the audit queue, the first entity audit requirement corresponding to a first associate entity; and
add a first document corresponding to the first entity audit requirement and the first associate entity to the audit queue from the document batch based on the first entity audit requirement being unsatisfied.

13. The at least one non-transitory computer-readable medium of claim 12, comprising instructions that, in response to being executed by the processor circuit, cause the processor circuit to:
determine the first entity audit requirement remains unsatisfied after adding the first document to the audit queue;
add a second document corresponding to the first entity audit requirement and the first associate entity to the audit queue from the document batch based on the first entity audit requirement being unsatisfied after adding the first document to the audit queue; and
determine the first entity audit requirement is satisfied after adding the second document to the audit queue.

14. The at least one non-transitory computer-readable medium of claim 9, wherein selection of the first bucket from the set of buckets is based on the document batch and the priorities in the set of audit parameters.

15. The at least one non-transitory computer-readable medium of claim 9, wherein calculation of the one or more document audit requirements for each authentication requirement in the master set is based on the document batch, the one or more audit percentages in the set of audit parameters, and the one or more audit rules in the set of audit parameters.

16. The at least one non-transitory computer-readable medium of claim 9, wherein each document in the document batch comprises a loan application and the master set of authentication requirements includes one or more of proof of income, proof of residence, gap insurance, service contract, and social security number.

17. A computer-implemented method, comprising:
identifying a set of audit parameters comprising a master set of authentication requirements and a date range, wherein each authentication requirement in the master set of authentication requirements is associated with a priority, an audit percentage, one or more audit rules, and one or more baselines;
communicating with a first database to determine a document batch from a plurality of documents in the first database based on the date range, the document batch for analysis to generate an audit queue for audit of the document batch, wherein each document in the document batch includes one or more requisite authentication requirements and each of the one or more requisite authentication requirements corresponds to an associate entity, and wherein each of the one or more requisite authentication requirements corresponds to one of the authentication requirements from the master set of authentication requirements;
calculating one or more document audit requirements for each authentication requirement in the master set based on the document batch and the set of audit parameters;
generating a document audit requirement mapping for the document batch based on the one or more document audit requirements for each authentication requirement in the master set;
creating a set of buckets comprising a bucket that corresponds to each authentication requirement in the master set of authentication requirements;
sorting the document batch by authentication requirements with the set of buckets, wherein a document with multiple requisite authentication requirements is sorted into a corresponding multiple of buckets;
selecting a first bucket from the set of buckets based on the set of audit parameters;
identifying a first document sorted into the first bucket, wherein the first document comprises the document with a largest number of authentication requirements in the first bucket;
storing the first document to the audit queue in a first in, first out (FIFO) manner;
updating the document audit requirement mapping based on the authentication requirements associated with the first document and addition of the first document to the audit queue;
determining a first document audit requirement associated with the first bucket is unsatisfied based on the document audit requirement mapping;
identifying a second document sorted into the first bucket, wherein the second document comprises the document with a second largest number of authentication requirements in the first bucket;
storing the second document to the audit queue in the FIFO manner;
updating the document audit requirement mapping based on the authentication requirements associated with the second document and addition of the second document to the audit queue;
determining the first document audit requirement associated with the first bucket is satisfied; and communicating with a second database to make at least a portion of the audit queue accessible by a client, wherein communication with the second database includes at least a portion of data in the document batch obtained from the first database.

18. The computer-implemented method of claim 17, comprising:
selecting a second bucket from the set of buckets based on the set of audit parameters;
identifying a third document in the second bucket, wherein the third document comprises the document with a largest number of authentication requirements in the second bucket that is not already in the audit queue;
adding the third document to the audit queue in the FIFO manner;
updating the document audit requirement mapping based on the authentication requirements associated with the third document and addition of the third document to the audit queue; and
determining a second document audit requirement associated with the second bucket is satisfied based on the document audit requirement mapping.

19. The computer-implemented method of claim 17, the audit queue comprising an ordered list of one or more documents in the document batch to audit to satisfy the one or more document audit requirements for each authentication requirement in the master set.

20. The computer-implemented method of claim 17, comprising:
calculating one or more entity audit requirements for each associate entity corresponding to one or more documents in the document batch based on the document batch and the set of audit parameters;
determining a first entity audit requirement unsatisfied by the audit queue, the first entity audit requirement corresponding to a first associate entity; and
adding a first document corresponding to the first entity audit requirement and the first associate entity to the audit queue from the document batch based on the first entity audit requirement being unsatisfied.

* * * * *